United States Patent
Kobayashi

(10) Patent No.: US 9,361,016 B2
(45) Date of Patent: Jun. 7, 2016

(54) DISPLAY AND INPUT DEVICE, AND IMAGE FORMING APPARATUS

(71) Applicant: KYOCERA Document Solutions Inc.

(72) Inventor: Yuki Kobayashi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 225 days.

(21) Appl. No.: 13/864,384

(22) Filed: Apr. 17, 2013

(65) Prior Publication Data

US 2013/0290885 A1    Oct. 31, 2013

(30) Foreign Application Priority Data

Apr. 26, 2012    (JP) .................................. 2012-100652

(51) Int. Cl.
| | |
|---|---|
| *G06F 3/14* | (2006.01) |
| *G06F 3/0488* | (2013.01) |
| *H04N 1/00* | (2006.01) |
| *G03G 15/00* | (2006.01) |

(52) U.S. Cl.
CPC ............ *G06F 3/0488* (2013.01); *G03G 15/502* (2013.01); *H04N 1/00411* (2013.01); *H04N 1/00474* (2013.01)

(58) Field of Classification Search
CPC ...................................... G06F 3/14; G06F 3/17
USPC ............. 715/702, 765, 815; 713/320; 726/27; 455/566; 345/173
See application file for complete search history.

(56) References Cited

U.S. PATENT DOCUMENTS

| | | | | |
|---|---|---|---|---|
| 2005/0119031 | A1* | 6/2005 | Spalink et al. ................ | 455/566 |
| 2007/0250936 | A1* | 10/2007 | Nakamura et al. ............. | 726/27 |
| 2011/0191611 | A1* | 8/2011 | Boni ang gaw go et al. . | 713/320 |
| 2012/0036435 | A1* | 2/2012 | Yang et al. .................... | 715/702 |
| 2012/0151400 | A1* | 6/2012 | Hong et al. .................... | 715/769 |
| 2012/0169634 | A1* | 7/2012 | Lee ................................ | 345/173 |
| 2013/0212530 | A1* | 8/2013 | Takase et al. ................. | 715/815 |

FOREIGN PATENT DOCUMENTS

JP    2004-0709492    3/2004

* cited by examiner

*Primary Examiner* — Ruay Ho

(57) ABSTRACT

A display and input device of the present disclosure includes a display unit which displays plural objects in array with a predetermined spatial interval, and a touch panel which identifies plural positions touched by a user. The display unit enlarges an interval between two objects longer than the predetermined spatial interval upon an interval enlargement operation to touch two positions which include a position in a display area of at least one of the two objects and then enlarge an interval between the two positions. Under a status that the interval between the two objects is enlarged, the touch panel unit receives a destination confirmation operation to touch a destination position of an object to be moved in order to set the touched destination position to a destination of the object to be moved.

10 Claims, 27 Drawing Sheets

DISPLAY AND INPUT DEVICE, AND IMAGE FORMING APPARATUS

CROSS-REFERENCE TO RELATED APPLICATIONS

This application relates to and claims priority rights from a Japanese Patent Application No. 2012-100652, the entire disclosures of which are hereby incorporated by reference herein.

BACKGROUND

1. Field of the Invention

The present invention relates to a display and input device, and an image forming apparatus.

2. Description of the Related Art

It is known that conventional image forming apparatuses have plural sorts of functions such as a copy function, a scan function, and a facsimile function. In general, such an image forming apparatus is equipped with a display and input device which receives a selection instruction of a function to be used among the plural sorts of functions, a setting instruction of the function, and so forth.

In some cases, the display and input device of the image forming apparatus may be equipped with not only a hardware key but also a display unit which includes a touch panel to display sorts of objects. Such object to be displayed by the display and input device includes, for example, a soft key to receive sorts of setting, a folder icon to indicate a place where image data is stored, and so forth.

When displaying plural objects, the display and input device positions the objects in array with a predetermined order (i.e. a predetermined screen layout). However, some user may want to change the position order of the plural objects. Therefore, in general, in a status where the plural objects are positioned in array, the display and input device is configured to enable to change the position order of the plural objects by moving any one of the plural objects.

For instance, when a user wants to move an object to a position between other two objects which are adjacent to each other, the user touches a display position of the object to be moved, moves the touched position to a position between the two objects which are adjacent to each other with keeping the touch (i.e. until the touched position reaches a position between the two objects which are adjacent to each other), and then releases the touch, and consequently, the object to be moved is moved to a position between the other two objects which are adjacent to each other. Thus, an object can be moved with a drag and drop operation.

If an effective display area of the display and input device is relatively large, then a lot of objects can be displayed in one screen without requiring a short interval between objects which are adjacent to each other (i.e. with keeping a long interval between objects which are adjacent to each other). Therefore, in this case, when a user wants to move an object to a position between two objects which are adjacent to each other, the user can properly touch a position between two objects which are adjacent to each other.

However, if an effective display area of the display and input device is relatively small, then displaying a lot of objects in one screen results in a short interval between objects which are adjacent to each other. Therefore, in this case, some users may not properly touch a position between two objects which are adjacent to each other. For instance, even though the user believes that he/she touches a position between two objects which are adjacent to each other, in fact, the user may touch a display position of the object. If a user does not properly touch a position between two objects which are adjacent to each other, the user can not move an object to be moved to a position between the two objects which are adjacent to each other. Further, the user has to do such a movement operation of an object again and again until the user properly touches a position between two objects which are adjacent to each other. Therefore, this causes inconvenience for the user.

SUMMARY

A display and input device according to an aspect of the present disclosure includes a display unit configured to display plural objects in array with a predetermined spatial interval, and a touch panel unit disposed on the display unit and configured to identify plural positions touched by a user. The display unit is further configured to enlarge an interval between two objects which are adjacent to each other longer than the predetermined spatial interval upon an interval enlargement operation to the touch panel unit to (a) touch two positions which include a position in a display area of at least one of the two objects and then (b) enlarge an interval between the two positions. The touch panel unit is further configured to receive a destination confirmation operation to touch a destination position of an object to be moved in order to set the touched destination position to a destination of the object to be moved, under a status that the interval between the two objects is enlarged.

These and other objects, features and advantages of the present invention will become more apparent upon reading of the following detailed description along with the accompanied drawings.

DETAILED DESCRIPTION

Whole Configuration of an Image Forming Apparatus

In the following part, as an example, explained is an image forming apparatus (e.g. a multifunction peripheral) which has plural sorts of functions such as a copy function, a send (scan) function, a facsimile function and a box function. The box function means a function to store image data in a pre-registered storage area called "box" (for instance, a folder generated in a memory unit 113 mentioned below), and to print on the basis of the stored image data.

Figure 1:
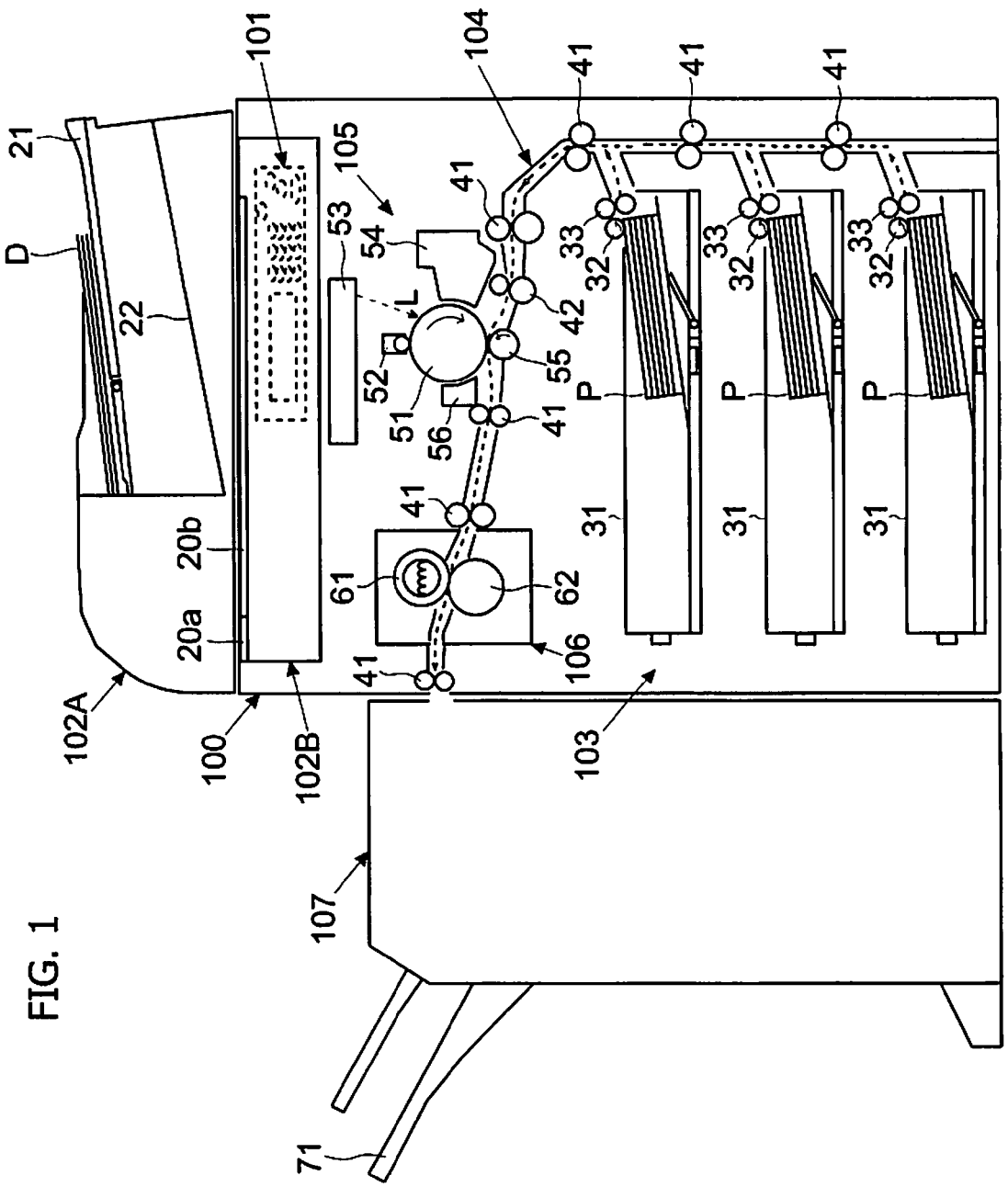
FIG. 1 shows a schematic diagram of an image forming apparatus equipped with a display and input device of an embodiment according to the present disclosure.

As shown in FIG. 1, an image forming apparatus 100 of this embodiment includes an operation panel 101 (corresponding to a "display and input device"), a document transporting unit 102A, an image scanning unit 102B, a sheet feeding unit 103, a sheet transporting unit 104, an image forming unit 105, a fusing unit 106, a postprocessing unit 107, and so forth.

Figure 2:
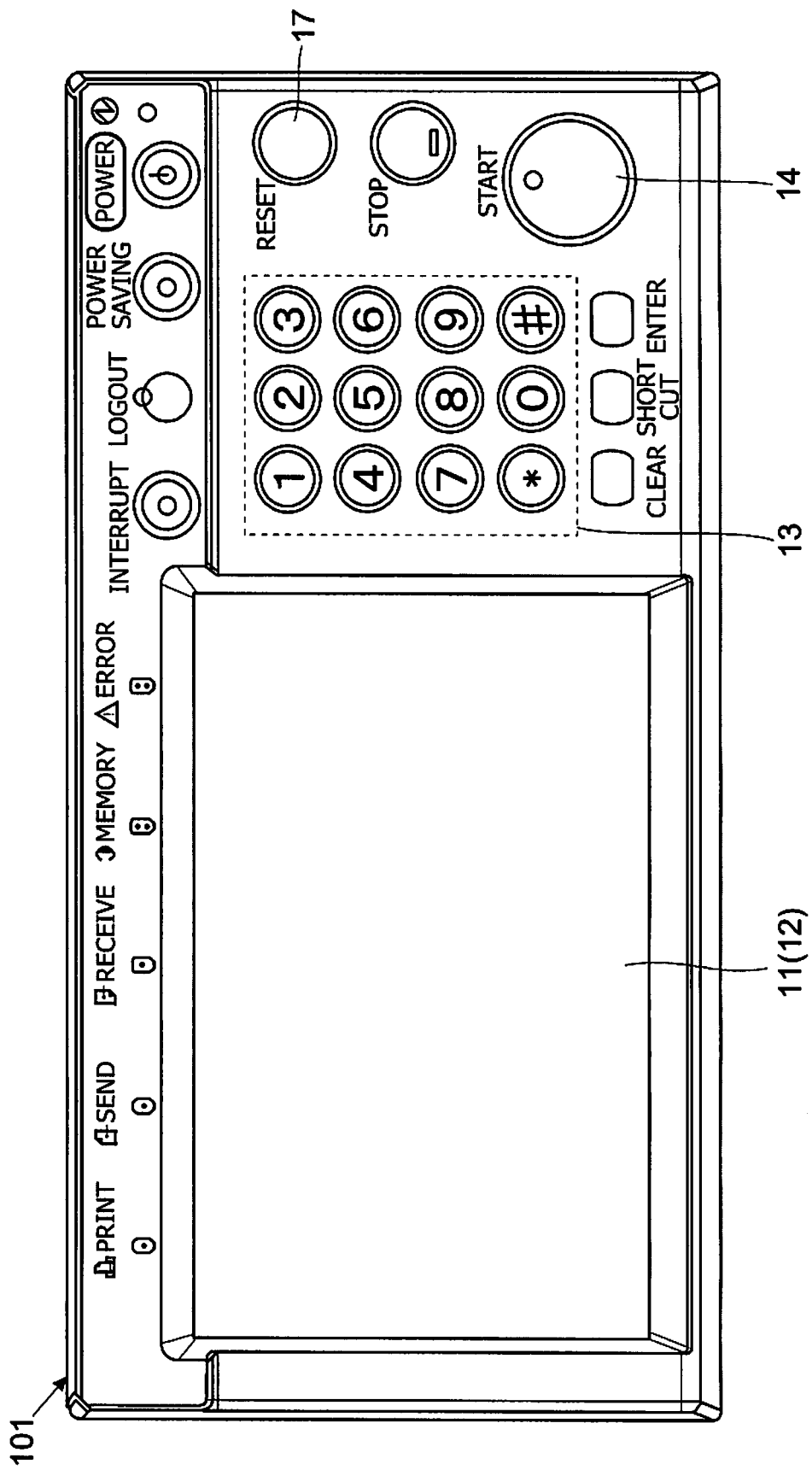
FIG. 2 shows a detailed diagram of the display and input device of the image forming apparatus shown in FIG. 1.

For example, the operation panel 101 is disposed on a front side of the apparatus. As shown in FIG. 2, the operation panel 101 includes a liquid crystal display unit 12 (corresponding to a "display unit") and on a surface of it a touch panel unit 11 is disposed. The touch panel unit 11 is a multi-touch panel capable of detecting plural touched positions touched by a user at the same time. The liquid crystal display unit 12 displays a screen which includes a soft key to receive an input operation from a user, a message and so forth. Detailed explanation of screens displayed by the liquid crystal display unit 12 is mentioned below. The touch panel unit 11, which covers a surface of the liquid crystal display unit 12, is disposed to identify a soft key selected by a user (i.e. a soft key touched through the touch panel unit 11 by a user). Further, the operation panel 101 is equipped with hardware keys such as a numeric keypad 13 to received a numeric value input and a start key 14 to receive a start instruction for performing a function.

Return to FIG. 1, the document transporting unit 102A is attached to be enabled to open and close rotationally around a rotation shaft (not shown) disposed in a back side of the image scanning unit 102B. The document transporting unit 102A draws out a document D set on a document set tray 21, transports it onto a contact glass 20a for transportation image scan, and outputs it to a document output tray 22. Further, the document transporting unit 102A also has a function to press down the document D put on a contact glass 20b for flatbed image scan.

The image scanning unit 102B scans the document D and generates its image data. The image scanning unit 102B is equipped with optical elements such as an exposure lamp, a mirror, a lens and an image sensor, although they are not shown in the figures. The image scanning unit 102B applies light to either the document D while it is transported through on the contact glass 20a or the document D put on the contact glass 20b, and generates image data by performing analog-digital transformation of an output value from the image sensor which detects reflection light from the document D.

Therefore, printing can be performed on the basis of the image data obtained by a reading action (i.e. scanning) of the document D by the image scanning unit 102B. Further, the image data generated by scanning can also be stored.

The sheet feeding unit 103 includes plural cassettes 31 capable of stocking a paper sheet P, and supplies the paper sheet P from the cassettes 31 to the sheet transporting unit 104. The sheet feeding unit 103 is equipped with a picking-up roller 32 to draw out the stocked paper sheet P, and a separating roller pair 33 to reduce multi-sheet feeding of the paper sheets P.

The sheet transporting unit 104 transports the paper sheet P inside the image forming apparatus 100. Specifically, the sheet transporting unit 104 performs this transportation, so that the paper sheet P supplied from the sheet feeding unit 103 is transported through the image forming unit 105 and the fusing unit 106 in the order written here. The sheet transporting unit 104 is equipped with plural transporting roller pairs 41 to transport the paper sheet P. Further, the sheet transporting unit 104 is also equipped with a registration roller pair 42 to keep the paper sheet P waiting before the image forming unit 105 and transport it into the image forming unit 105 at an appropriate timing.

The image forming unit 105 generates a toner image based on the image data, and transfers the toner image onto the paper sheet P. The image forming unit 105 includes a photoconductor drum 51, a charging device 52, an exposure device 53, a developing device 54, a transferring roller 55, and a cleaning device 56.

In a toner image generation process and a toner image transfer process, at first, the photoconductor drum 51 is driven to rotate, and the charging device 52 charges the surface of the photoconductor drum 51 up to a predetermined voltage. In addition, the exposure device 53 outputs a light beam L based on the image data, and applies it onto the surface of the photoconductor drum 51 with scanning the light beam. Consequently, an electrostatic latent image is formed on the surface of the photoconductor drum 51. The developing device 54 develops an image by supplying toner to the electrostatic latent image formed on the surface of the photoconductor drum 51.

The transferring roller 55 rotatably contacts the surface of the photoconductor drum 51 with pressure. Further, a predetermined voltage is applied to the transferring roller 55. Under this condition, at an appropriate timing, the registration roller pair 42 sends the paper sheet P into the contacting position between the transferring roller 55 and the photoconductor drum 51. Consequently, the toner image is transferred from the surface of the photoconductor drum 51 to the paper sheet P. After finishing the toner image transfer process, the cleaning device 56 removes residual toner and so forth on the surface of the photoconductor drum 51.

The fusing device 106 fixes the toner image transferred on the paper sheet P by heating and pressuring it. The fusing device 106 includes a fusing roller 61 which contains a heat source and a pressuring roller 62 which contacts the fusing roller 61 with pressure. The paper sheet P on which the toner image has been transferred is heated and pressured while moving through between the fusing roller 61 and the pressuring roller 62. Consequently, the toner image is fixed on the paper sheet P and the printing is finished.

The postprocessing unit 107 receives the paper sheet P after printing from the fusing unit 106, and performs postprocessing such as a staple process and a punching process. After the postprocessing for the paper sheet P after printing, the postprocessing unit 107 outputs the paper sheet P to an output tray 71.

(Hardware Configuration of the Image Forming Apparatus)

Figure 3:
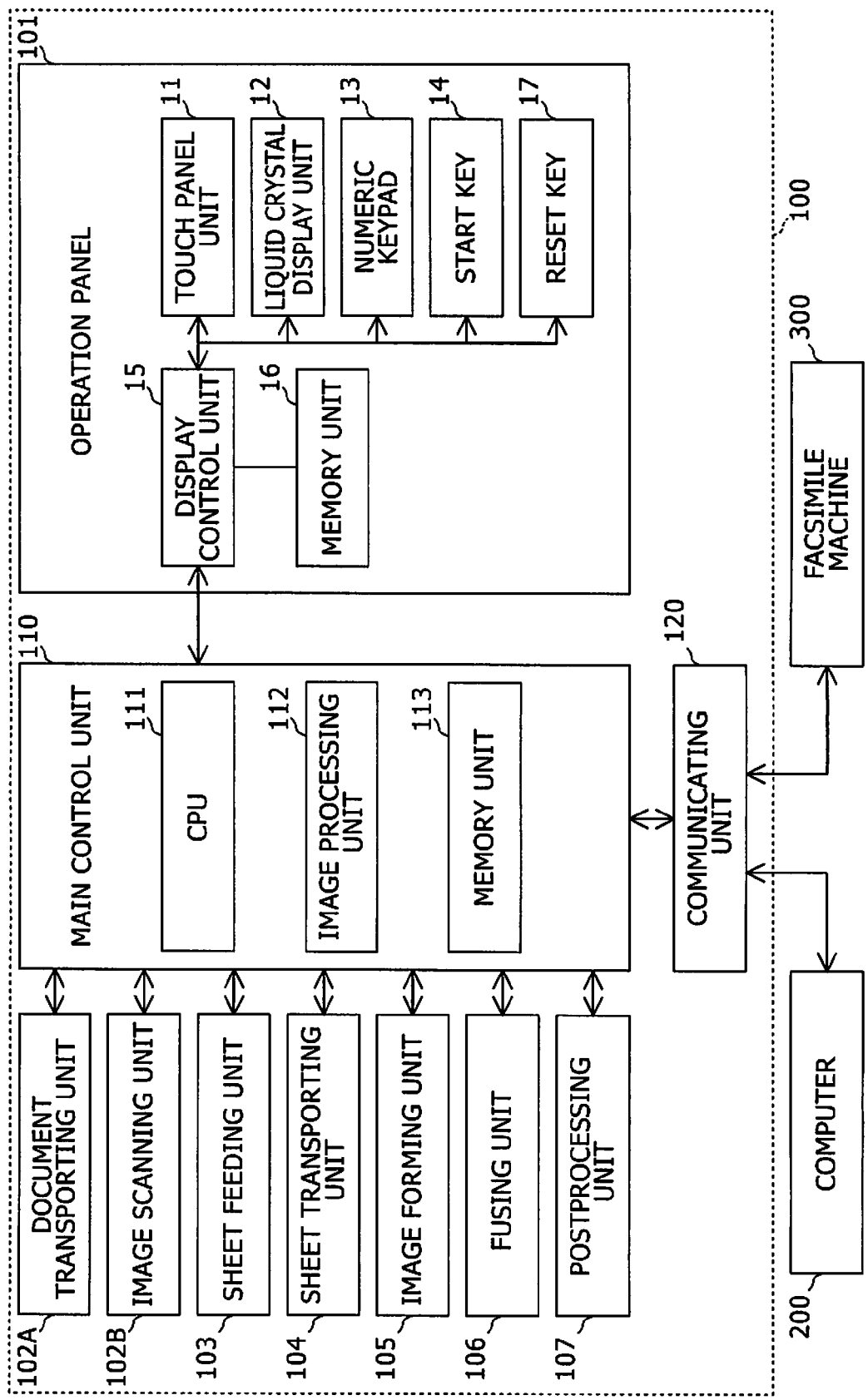
FIG. 3 shows a block diagram which indicates a hardware configuration of the image forming apparatus shown in FIG. 1.

As shown in FIG. 3, the image forming apparatus 100 includes a main control unit 110. The main control unit 110 includes a CPU 111 as a central processing unit, an image processing unit 112, a memory unit 113 and so forth. The image processing unit 112 consists of an ASIC for image processing purpose, a memory and other parts, and performs sorts of image processing (e.g. zooming, density changing, and data format conversion). The memory unit 113 consists of a ROM, a RAM, an HDD and other parts; and for example, a program and data required to perform a function have been stored in the ROM, and the program and the data are loaded to the RAM.

The main control unit 110 is connected to the document transporting unit 102A, the image scanning unit 102B, the sheet feeding unit 103, the sheet transporting unit 104, the image forming unit 105, the fusing unit 106, the postprocessing unit 107 and so forth. On the basis of the program and the data stored in the memory unit 113, the main control unit 110 performs whole system control, image processing control, driving control for motors which drive rotation members, and so forth.

The main control unit 110 is also connected to the operation panel 101. The operation panel 101 includes a display control unit 15 connected to the main control unit 110. The display control unit 15 consists of a CPU and other parts, receives an instruction from the main control unit 110, and controls a display action of the operation panel 101 according to the instruction. For example, if a user touches a soft key displayed on the liquid crystal display unit 12 through the touch panel unit 11, then the display control unit 15 identifies coordinate values of the touched position on the basis of an output of the touch panel unit 11. Further, the display control unit 15 identifies a soft key touched through the touch panel unit 11 by a user (i.e. a soft key selected by a user). A memory unit 16 is connected to the display control unit 15. Data which indicates a relationship between an output of the touch panel unit 11 and coordinate values of the touched position is stored in the memory unit 16.

Further, the main control unit 110 is connected to the communicating unit 120. For example, the communicating unit 120 is connected via a network to an external computer 200 to be enabled to communicate with it. Therefore, printing can be performed on the basis of image data transmitted from the computer 200, and image data generated by image scan can be transmitted to the computer 200. The communicating unit 120 may be included in a modem, and in such a case, facsimile communication is available via a network such as a telephone line to an external facsimile machine 300.

(Screens Displayed on the Operation Panel)

Figure 4:
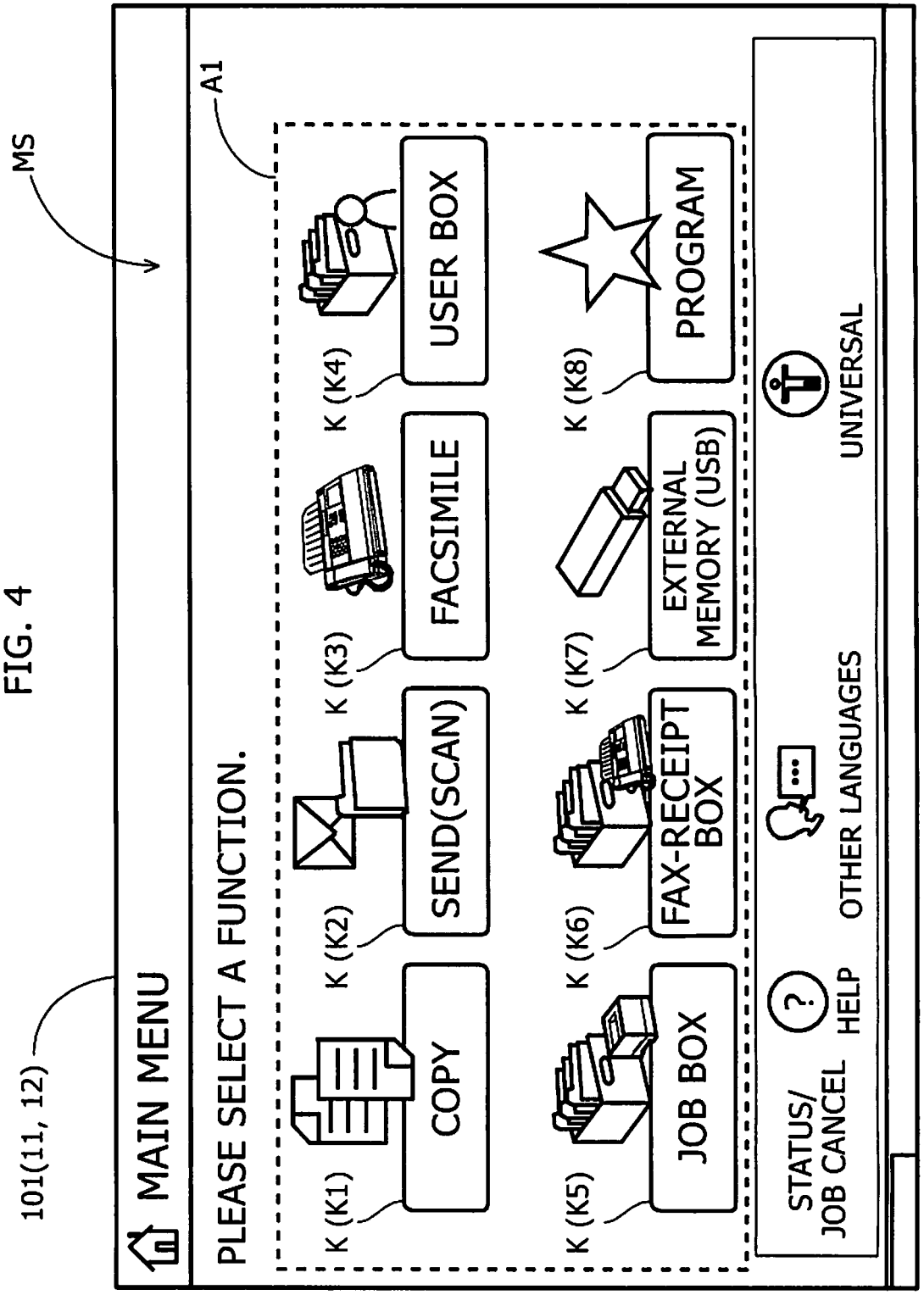
FIG. 4 shows a diagram which indicates an example of a screen (a main menu screen) displayed by the display and input device of the image forming apparatus shown in FIG. 1.

Upon switching on the main power supply, the operation panel 101 displays a main menu screen MS as shown in FIG. 4 as the initial screen. In the main menu screen MS, plural soft keys K (corresponding to an "object") corresponding to plural sorts of functions are arranged to receive a selection instruction for selecting a function to be used among the plural sorts of functions.

For example, the operation panel 101 displays the plural soft keys K in array with a predetermined spatial interval in a predetermined object display area A1 (e.g. the area surrounded by the dashed line in the figure). The soft keys K are arranged in a predetermined position order, and position information on display positions of the soft keys K (i.e. information on the position order of the soft keys K) is stored in the memory unit 16. When displaying the main menu screen MS, the operation panel 101 arranges the plural soft keys K on the basis of the position information stored in the memory unit 16.

While the main menu screen MS is displayed, if a user touches a display position of any one of the plural soft keys K through the touch panel unit 11, then the operation panel 101 determines that the soft key K displayed at the touched position is selected by a user. For example, if a user starts to touch a display position of a soft key K and performs an operation to release the touch (i.e. if a user performs a tap operation), then the soft key K is selected. Upon the selection of the soft key K, the operation panel 101 displays a setting screen (e.g. as shown in FIG. 5) to receive a setting instruction for a function corresponding to the selected soft key K.

Figure 5:
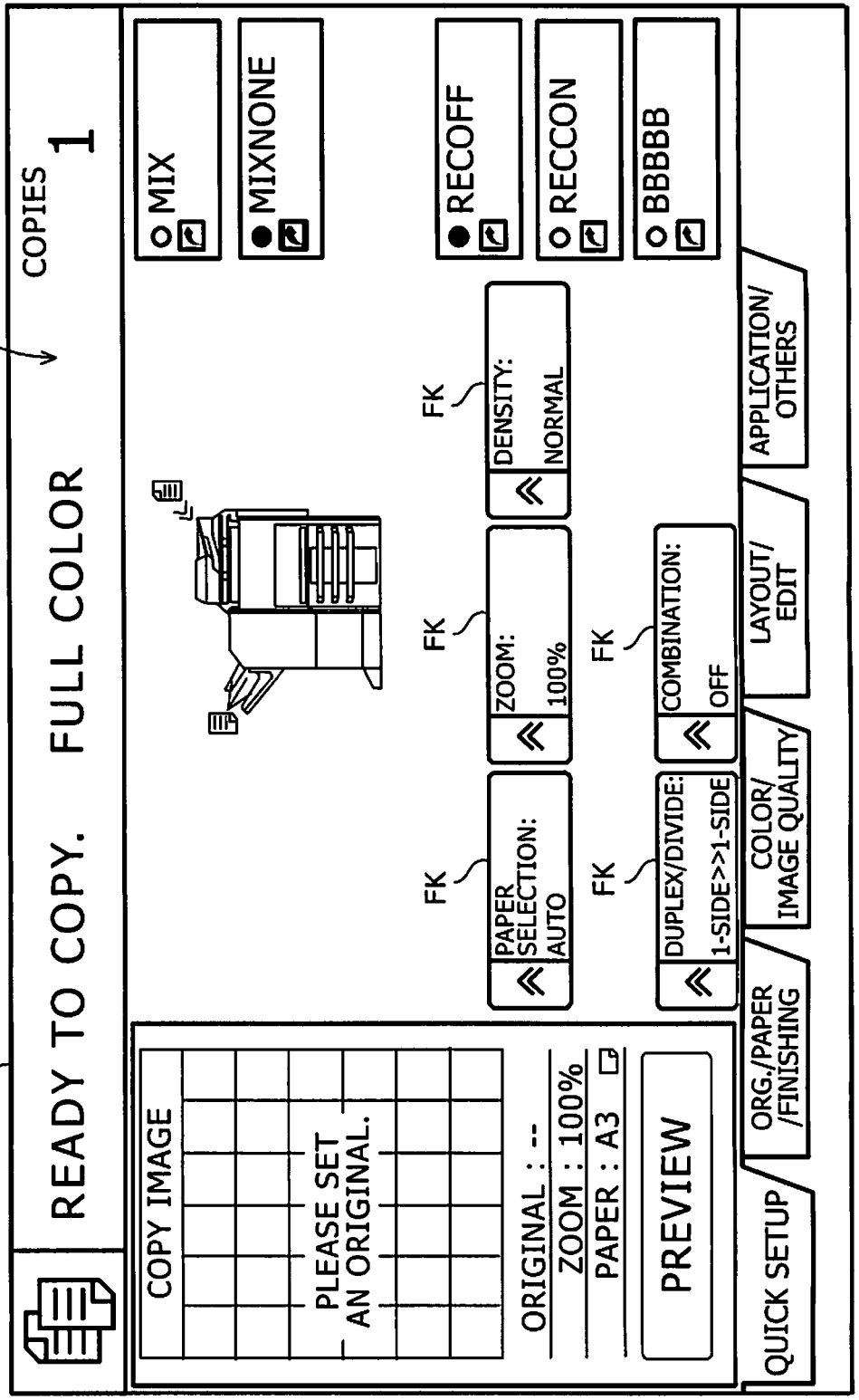
FIG. 5 shows a diagram which indicates an example of a screen (a copy function setting screen) displayed by the display and input device of the image forming apparatus shown in FIG. 1.

Specifically, upon a user's touch (tap operation) to a display position of the soft key K1, the operation panel 101 displays a setting screen SC to receive a setting instruction for a copy function as shown in FIG. 5. In the setting screen SC of the copy function, plural setting keys FK are arranged corresponding to setting items of the copy function. FIG. 5 shows a setting screen SC, as an instance, in which plural setting keys FK are arranged corresponding to setting items such as paper selection, zoom, density, duplex/division, and page combination. Current setting values of the setting items are displayed on the plural setting keys FK corresponding to the setting items, respectively. When a user touches and selects any one of the plural setting keys FK through the touch panel unit 11, the operation panel 101 displays a screen (not shown) to input a setting value of a setting item corresponding to the selected setting key FK. Therefore, a user can confirm current setting values of plural setting items for the copy function, and can change the setting values.

Return to FIG. 4, upon a user's touch to a display position of the soft key K2 through the touch panel unit 11, the operation panel 101 displays a setting screen (not shown) to receive a setting instruction of the send (scan) function. The setting screen of the send (scan) function enables a user to specify a transmission destination (a save destination) of image data generated by image scan and so forth. Further, upon a user's touch to a display position of the soft key K3 through the touch panel unit 11, the operation panel 101 displays a setting screen (not shown) to receive a setting instruction of the facsimile function. The setting screen of the facsimile function enables a user to input a facsimile number and so forth.

Figure 6:
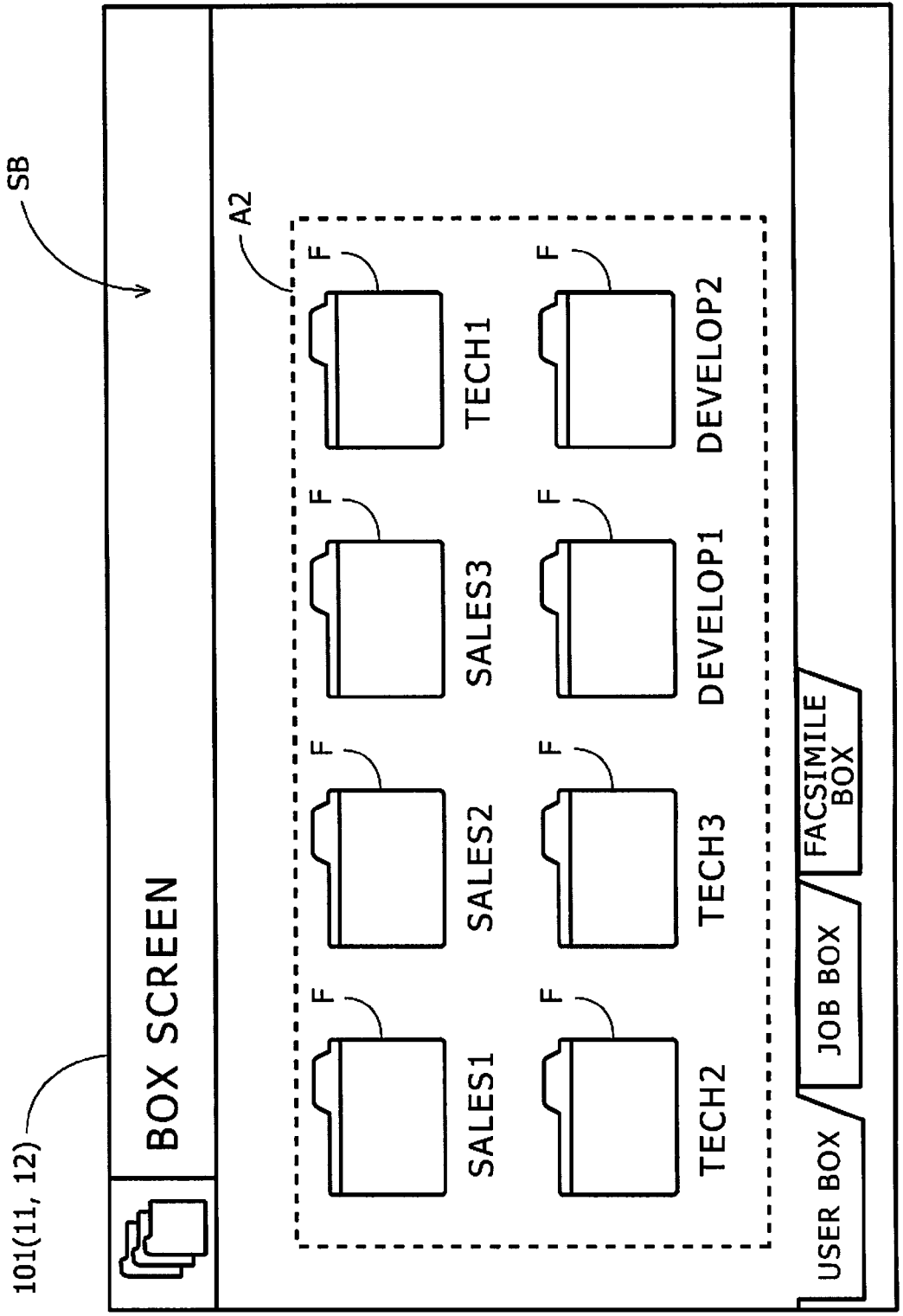
FIG. 6 shows a diagram which indicates an example of a screen (a box function setting screen) displayed by the display and input device of the image forming apparatus shown in FIG. 1.

Furthermore, upon a user's touch to a display position of any one of the soft keys K4 to K6 through the touch panel unit 11, the operation panel 101 displays a setting screen SB to receive a setting instruction of the box function as shown in FIG. 6. In the setting screen SB of the box function, for example, a folder icon F (corresponding to an "object") which indicates a registered box is arranged. If plural boxes are registered, then plural folder icons F which indicates the respective plural boxes are arranged in the setting screen SB. In such a case, the operation panel 101 displays the plural folder icons F in array with a predetermined spatial interval in a predetermined object display area A2 (e.g. the area surrounded by the dashed line in the figure).

The operation panel 101 displays the setting screen SB of the box function shown in FIG. 6, and receives a user's selection of a box. When a user touches (taps) a display position of any one of the plural folder icons F through the touch panel unit 11, the operation panel 101 determines that a box corresponding to a folder icon FK displayed at the touched position is selected by a user.

Among box functions corresponding to the soft keys K4 to K6 in the main menu screen MS shown in FIG. 4, the box function corresponding to the soft key K4 is a function which stores image data generated by image scan and performs printing on the basis of the stored image data (i.e. a user box function). The box function corresponding to the soft key K5 is a function which transmits image data from the computer 200 to the image forming apparatus 100 to store it and performs printing on the basis of the stored image data (i.e. a job box function). The box function corresponding to the soft key K6 is a function which stores facsimile date received by the communicating unit 120 and performs printing on the basis of the stored facsimile data (i.e. a facsimile box function).

Further, upon a user's touch to a display position of the soft key K7 through the touch panel unit 11, the operation panel 101 displays a setting screen (not shown) to receive a setting instruction of a function which uses an external memory. "A function which uses an external memory" means a function which performs printing on the basis of image data stored in the external memory and/or stores image data in the external memory.

Furthermore, the soft key K8 is a soft key K corresponding to a program function, and upon a user's touch to a display position of the soft key K8 through the touch panel unit 11, the operation panel 101 displays a program selection screen (not shown) to receive a selection instruction for a user to select a program to be invoked among registered programs. The "program function" means a function to register as a "program" at least one setting item (i.e. setting value) which a user has selected in advance among plural setting items of a function such as the copy function or the send (scan) function.

(Edit Process of the Screen Layout)

In this embodiment, while a screen is displayed in which plural objects are arranged in array, a position order of the plural objects (i.e. a screen layout) can be changed by moving any one of the plural objects. For example, in the main menu screen MS shown in FIG. 4, the position order of the plural soft keys K can be changed. Further, in the setting screen SB shown in FIG. 6, the position order of the plural folder icons F can be changed. In the following part, an example of the edit process is explained on the main menu screen MS shown in FIG. 4.

In this main menu screen MS, when a user wants to change a position order of the plural soft keys K, the user touches a display position of a soft key K which the user wants to move, slides the touched position to a destination with keeping the touch, and releases the touch at the destination (i.e. the user performs a drag and drop operation).

For example, when a user wants to move the soft key K7 to a position between the soft key K3 and the soft key K4, the user touches a display position of the soft key K7 which the user wants to move, slides the touched position to a position between the soft key K3 and the soft key K4 with keeping the touch, and releases the touch at a position between the soft key K3 and the soft key K4 (i.e. the user performs a drag and drop operation). Upon receive such a user operation, the operation panel 101 changes the position order of the plural soft key K, and displays the plural soft key K in array with a predetermined spatial interval. In the same manner, the position order of the plural folder icons F can be changed in the setting screen of the box function shown in FIG. 6.

When the plural soft keys K are displayed in array with a predetermined spatial interval, the interval between two soft keys K which are adjacent to each other is relatively short. Therefore, some users may not properly touch a position between two soft keys K which are adjacent to each other. For instance, even though the user believes that he/she touches a position between two soft keys K which are adjacent to each other, in fact, the user may touch a display position of the soft key K. If a user does not properly touch a position between two soft keys K which are adjacent to each other, the user can not move a soft key K to be moved to a position between the two soft keys K which are adjacent to each other. In the setting screen SB of the box function shown in FIG. 6, if a user does not properly touch a position between two folder icons F which are adjacent to each other and touches a display position of the folder icon F in error, the folder icon F to be moved may be moved to a lower layer of the folder icon F displayed at the touched position.

In this embodiment, to reduce such trouble, it is possible to enlarge an interval between two objects which are adjacent to each other longer than the predetermined interval. In the following part, explained is a detailed process for the main menu screen MS shown in FIG. 4 as an example, and for explanation here, it is assumed that the soft key K7 is to be moved and the destination is a position between soft key K3 and the soft key K4. In figures referred in the following explanation, a white hollow circle mark indicates a touched position, and a white hollow arrow mark indicates a moving direction of the touched position.

In a status where the liquid crystal display unit 12 displays the plural soft keys K in array with a predetermined spatial interval (i.e. the status shown in FIG. 4), upon an interval enlargement operation to touch two positions which include a position in a display area of at least one of the soft keys K and then enlarge an interval between the two positions, the touch panel unit 11 receives an instruction to enlarge the interval between two soft keys K including the soft key K displayed at the touched position which are adjacent to each other longer than the predetermined interval.

Figure 7:
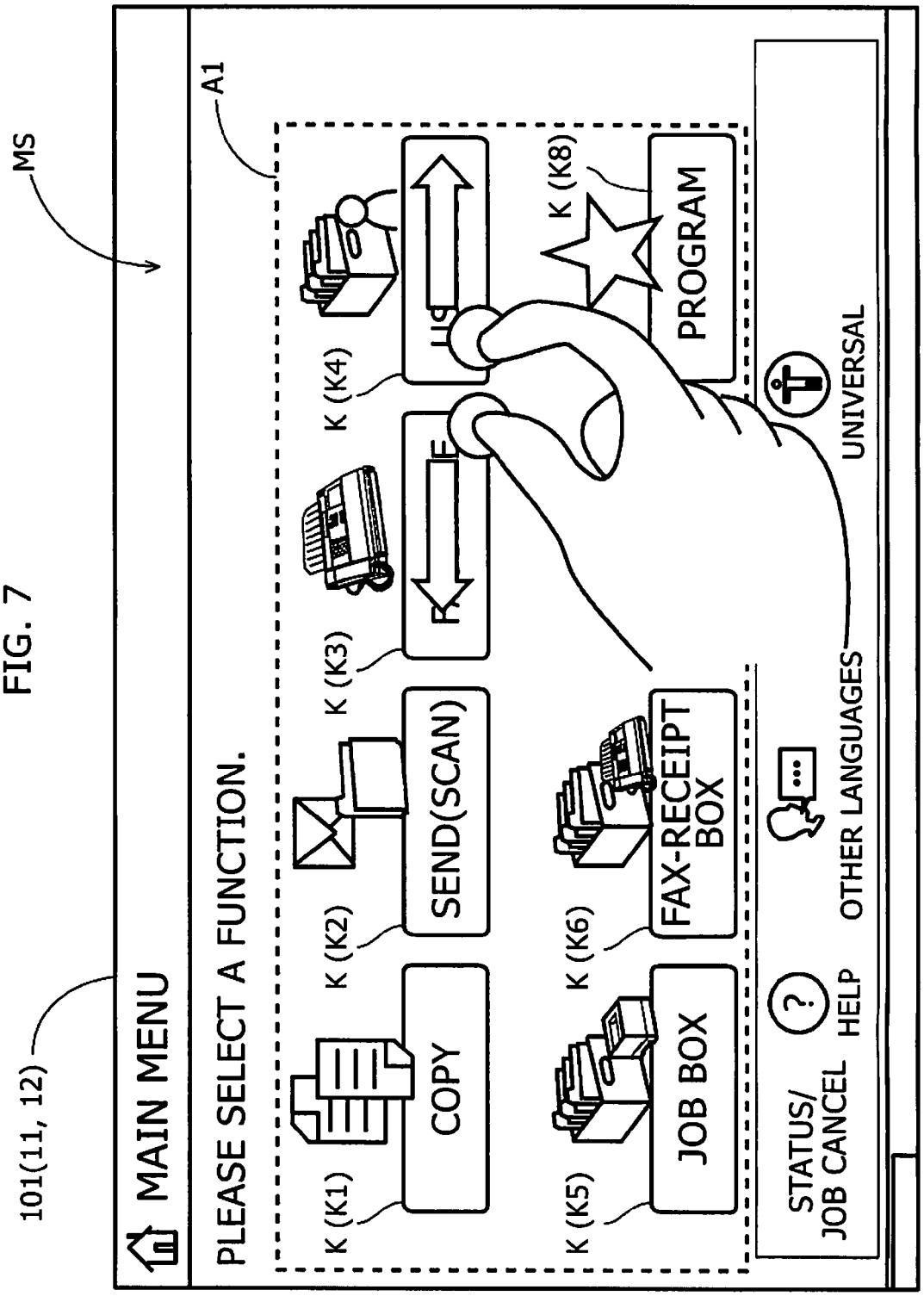
FIG. 7 shows a diagram which explains an operation and a screen which are performed and displayed to move an object (i.e. to switch to a layout edit mode) in the display and input device of the image forming apparatus shown in FIG. 1.

When a user wants to specify the destination between the soft key K3 and the soft key K4 (i.e. a user wants to enlarge an interval between the soft key K3 and the soft key K4), the user performs an interval enlargement operation on the touch panel unit 11. This interval enlargement operation is, as shown in FIG. 7, an operation to touch two positions which include a position in a display area of at least one of the soft keys K3 and K4 and then enlarge an interval between the two positions. FIG. 7 shows an instance of the interval enlargement operation to (a) touch respective two display positions of the soft keys K3 and K4 and (b) slide the two touched positions in respective directions (here, the horizontal directions on the screen) to make the interval longer.

Figure 8:
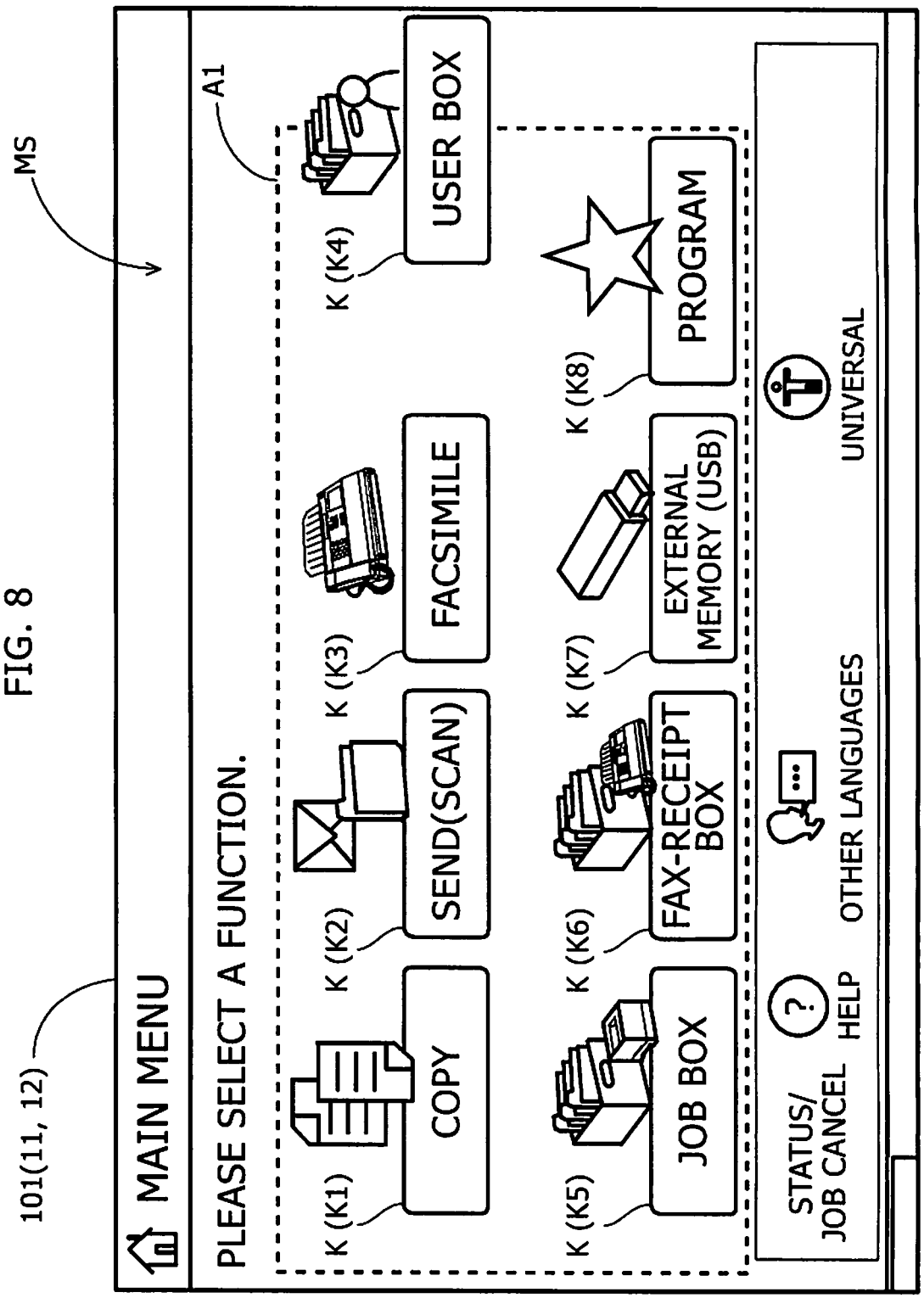
FIG. 8 shows a diagram which explains a screen displayed in the layout edit mode of the display and input device of the image forming apparatus shown in FIG. 1.

Upon such an interval enlargement operation, the liquid crystal display unit 12 enlarges the interval between the two soft keys K including the soft key K displayed at the touched position which are adjacent to each other longer than the predetermined interval. Here, the liquid crystal display unit 12 enlarges the interval between the soft key K3 and the soft key K4. For example, as shown in FIG. 8, the liquid crystal display unit 12 moves the soft key K4 to the right direction of the screen (here, shifts the soft key K4 from the inside of the object display area A1 to the outside of the object display area A1) to enlarge the interval between the soft key K3 and the soft key K4. Therefore, even if a rest space (a space required to enlarge the interval between the two objects which are adjacent to each other) is almost nothing in the object display area, it is possible and easy to enlarge the interval between the two objects which are adjacent to each other.

Figure 9:
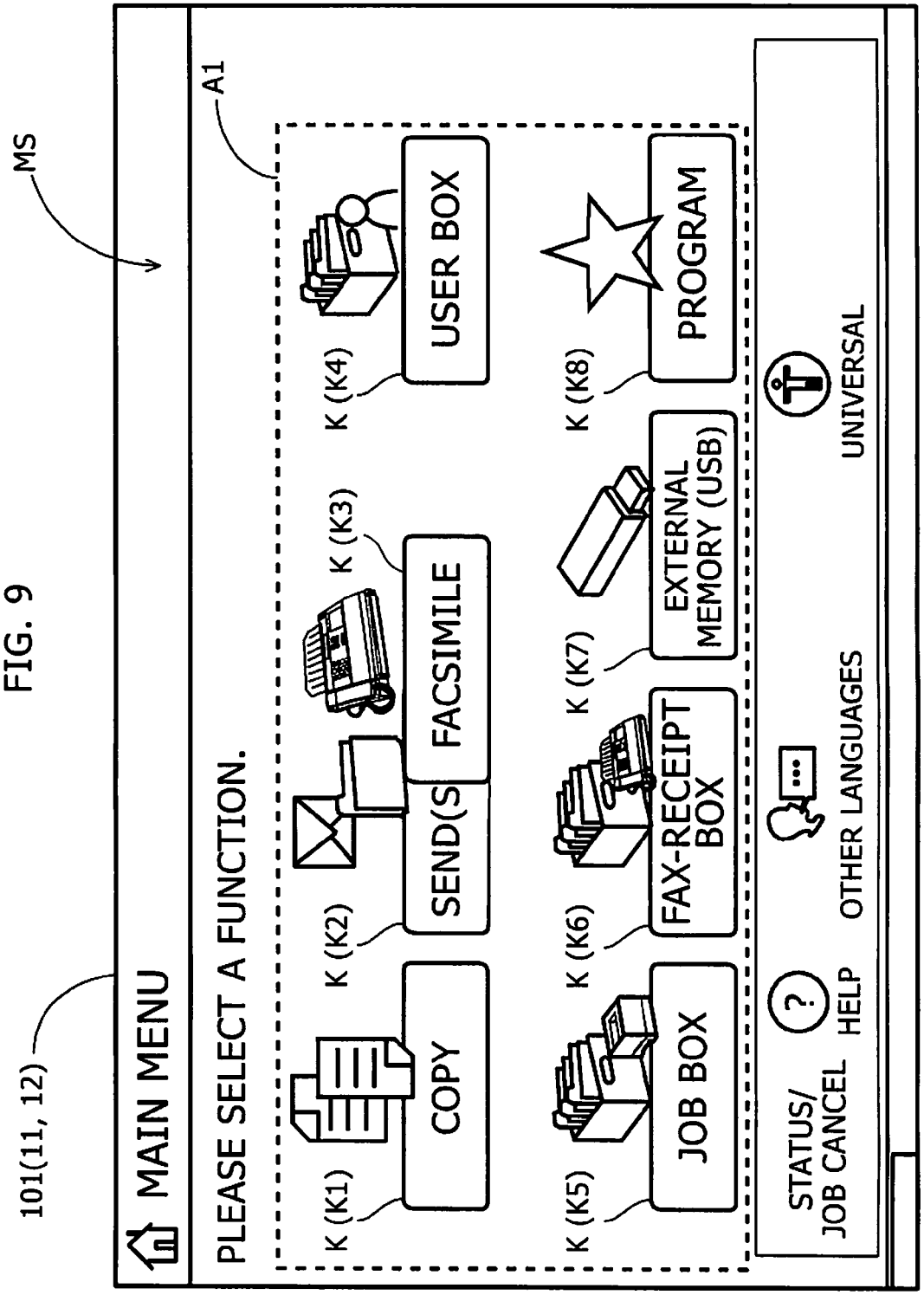
FIG. 9 shows a diagram which explains a screen displayed in the layout edit mode of the display and input device of the image forming apparatus shown in FIG. 1.

As another example, as shown in FIG. 9, it may move the soft key K3 to the left direction of the screen to enlarge the interval between the soft key K3 and the soft key K4. In this case, the soft key K3 may overlap the soft key K2. In this manner, it is possible and easy to enlarge the interval between the two objects which are adjacent to each other. Alternatively, it may move both of the soft keys K3 and K4 away from each other (i.e. move the soft key K3 to the left direction of the screen and move the soft key K4 to the right direction of the screen), although it is not shown here.

Further, upon the interval enlargement operation to the touch panel unit 11, the display control unit 15 switches to a layout edit mode capable of receiving an instruction to change a position order (i.e. a screen layout) of plural soft keys K. This means that the interval enlargement operation also acts as an operation to switch to the layout edit mode. In the layout edit mode, even if a user touches a display position of any one of the plural soft keys K, a current screen is not changed to a setting screen corresponding to the soft key K displayed at the touched position.

After switching to the layout edit mode, the touch panel unit 11 receives a destination confirmation operation (i.e. a screen layout edit operation to change a position order of the plural soft keys K). Here, the destination confirmation operation is an operation to touch a position between the two soft keys K between which the interval is enlarged in order to finally set the touched position to the destination of the soft key K to be moved.

Specifically, at first, the touch panel unit 11 receives a movement target setting operation (i.e. a screen layout edit operation to change a position order of the plural soft keys K). Here, the movement target setting operation is an operation to touch a display position of a soft key K as a movement target in order to finally set the soft key K displayed at the touched position to the movement target. After receiving the movement target setting operation, the touch panel unit 11 receives the destination confirmation operation.

Figure 10:
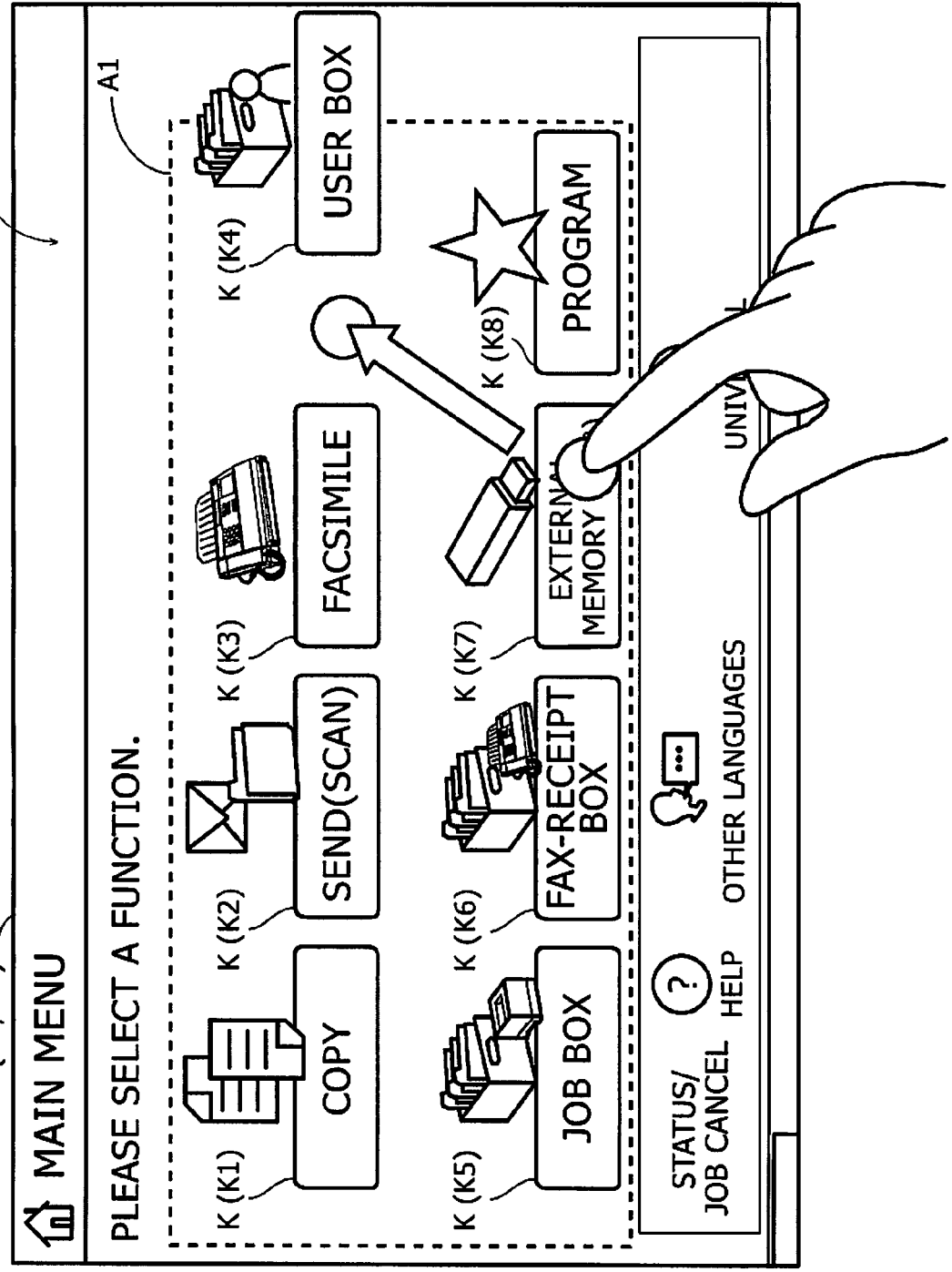
FIG. 10 shows a diagram which explains an operation and a screen which are performed and displayed to move an object (i.e. to change a position order of plural objects) in the display and input device of the image forming apparatus shown in FIG. 1.

Therefore, when a user wants to move the soft key K7 to a position between the soft key K3 and the soft key K4, the user touches a display position of the soft key K7 to set it to the movement target. Afterward, the user touches a position between the soft key K3 and the soft key K4 to set it to the destination of the soft key K7. For example, as shown in FIG. 10, the user moves the touched position to a position between the soft key K3 and the soft key K4 with keeping the touch (i.e. touches a position between the soft key K3 and the soft key K4), and then releases the touch at a position between the soft key K3 and the soft key K4. Alternatively, the user may touch a display position of the soft key K7 and release the touch there, and then touch a position between the soft key K3 and the soft key K7 and release the touch there.

Figure 11:
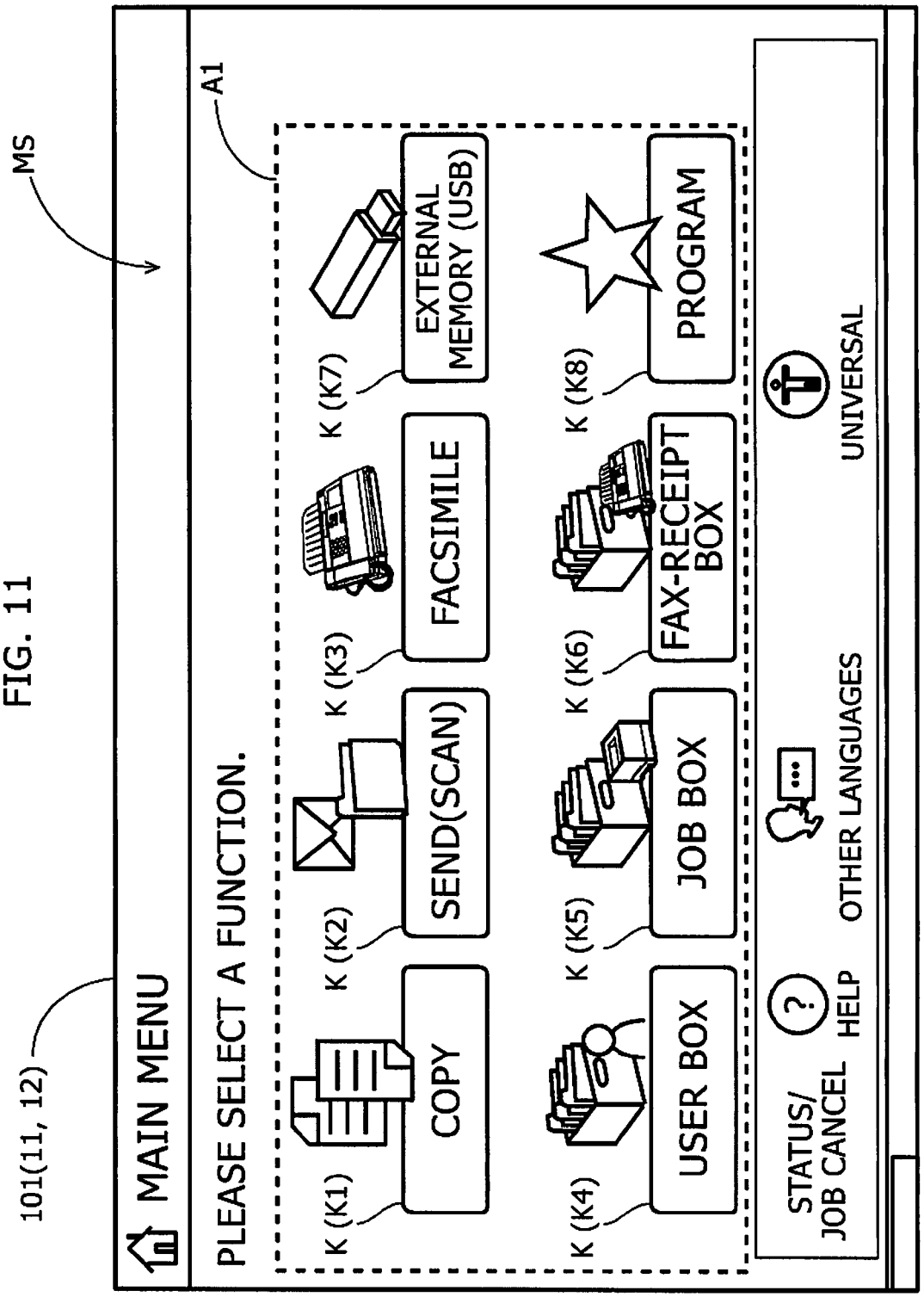
FIG. 11 shows a diagram which explains a screen displayed after changing the position order of the objects (i.e. screen layout) in the display and input device of the image forming apparatus shown in FIG. 1.

Upon the destination confirmation operation to the touch panel unit 11, the display control unit 15 updates position information on display positions of the plural soft keys K (i.e. information on a position order of the plural soft keys K). In addition, the display control unit 15 controls a display action of the liquid crystal display unit 12, as shown in FIG. 11, changes a position order of the plural soft keys K so as to arrange the soft key K as the movement target at the destination, and displays the plural soft keys K in array with a predetermined spatial interval in the changed position order. Consequently, the liquid crystal display unit 12 displays the soft key K7 at the position where the soft key K4 has been displayed before. At this time, the layout edit mode is released. Therefore, from a user's view, only performing the destination confirmation operation to the touch panel unit 11, the position order of plural objects is changed and the plural objects are displayed in array with the predetermined spatial interval; and therefore, it is convenient for the user.

Figure 12:
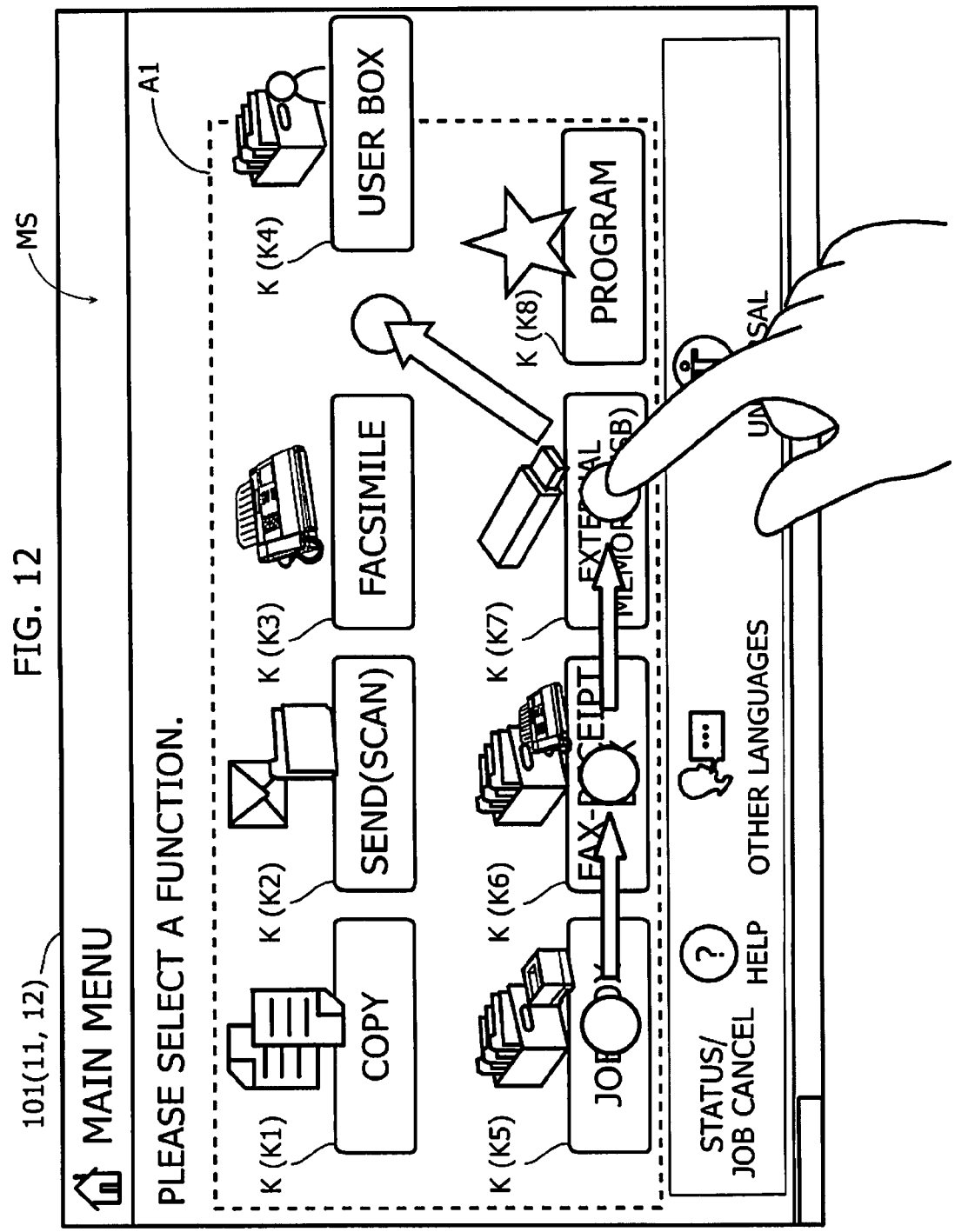
FIG. 12 shows a diagram which explains an operation and a screen which are performed and displayed to move an object (i.e. to change a position order of plural objects) in the display and input device of the image forming apparatus shown in FIG. 1.
Figure 13:
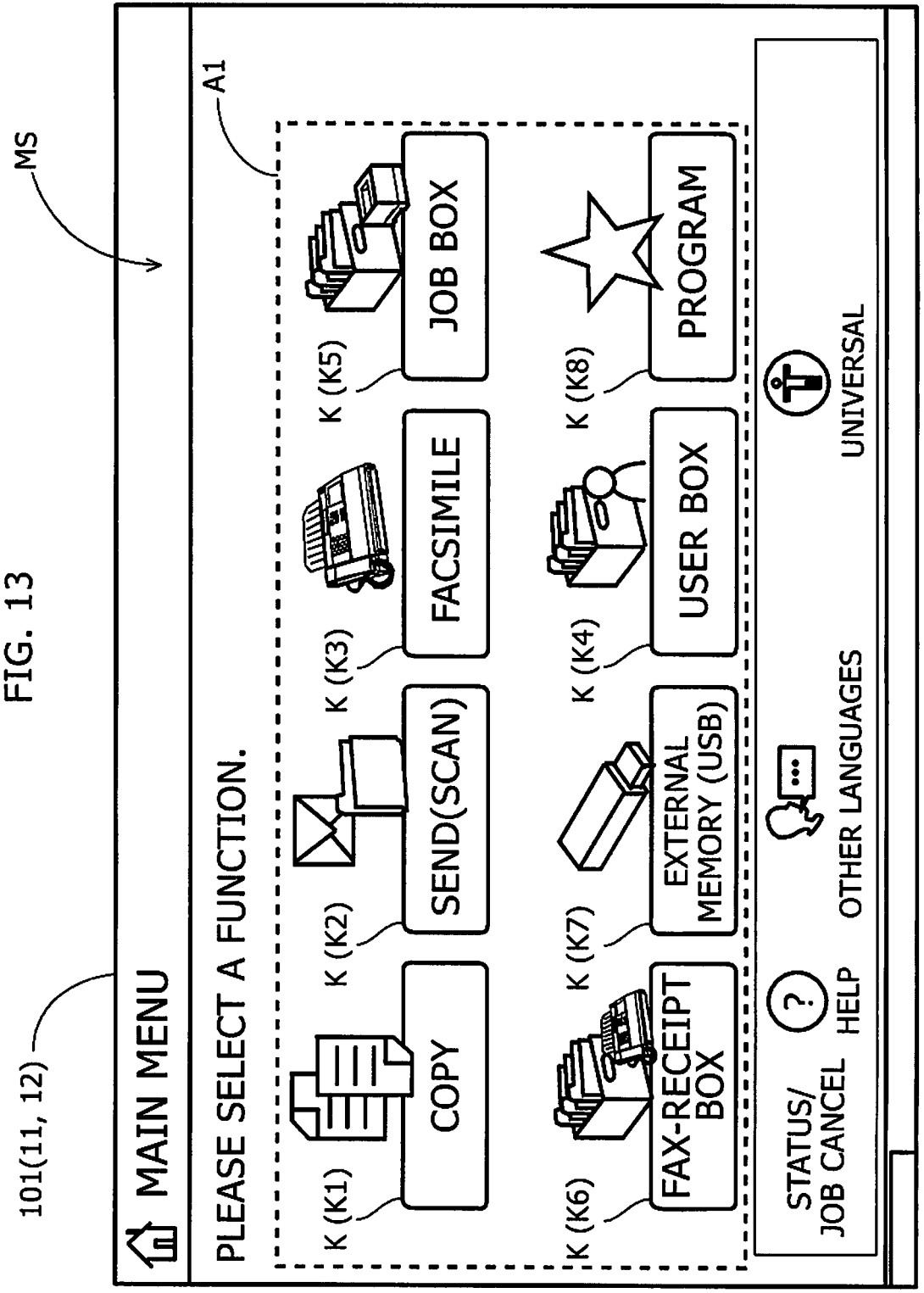
FIG. 13 shows a diagram which explains a screen displayed after changing the position order of the objects (i.e. screen layout) in the display and input device of the image forming apparatus shown in FIG. 1.

Some users may want to move two or more soft keys K at the same time. Therefore, after switching to the layout edit mode (i.e. after receiving the interval enlargement operation), the touch panel unit 11 can receive the movement target setting operation again and again until the destination confirmation operation is received. For example, in order to move the soft keys K5 to K7 at the same time, as shown in FIG. 12, the user touches display positions of the soft keys K5 to K7 one by one before the destination confirmation operation, and consequently, the soft keys K5 to K7 are set to the movement target. Afterward, the user should just perform the destination confirmation operation, that is, an operation to touch a destination the user wants to set. For example, if the destination the user wants to set is between the soft key K3 and the soft key K4, the user touches the display position of the soft key K7 at last, keeps the touch and moves the touched position to a position between the soft key K3 and the soft key K4. Consequently, the plural soft keys K are displayed in array in the position order shown in FIG. 13. Therefore, from a user's view, the user can set two or more objects to the movement target at the same time (the user can move two or more objects at the same time), and therefore, it is convenient for the user.

Figure 14:
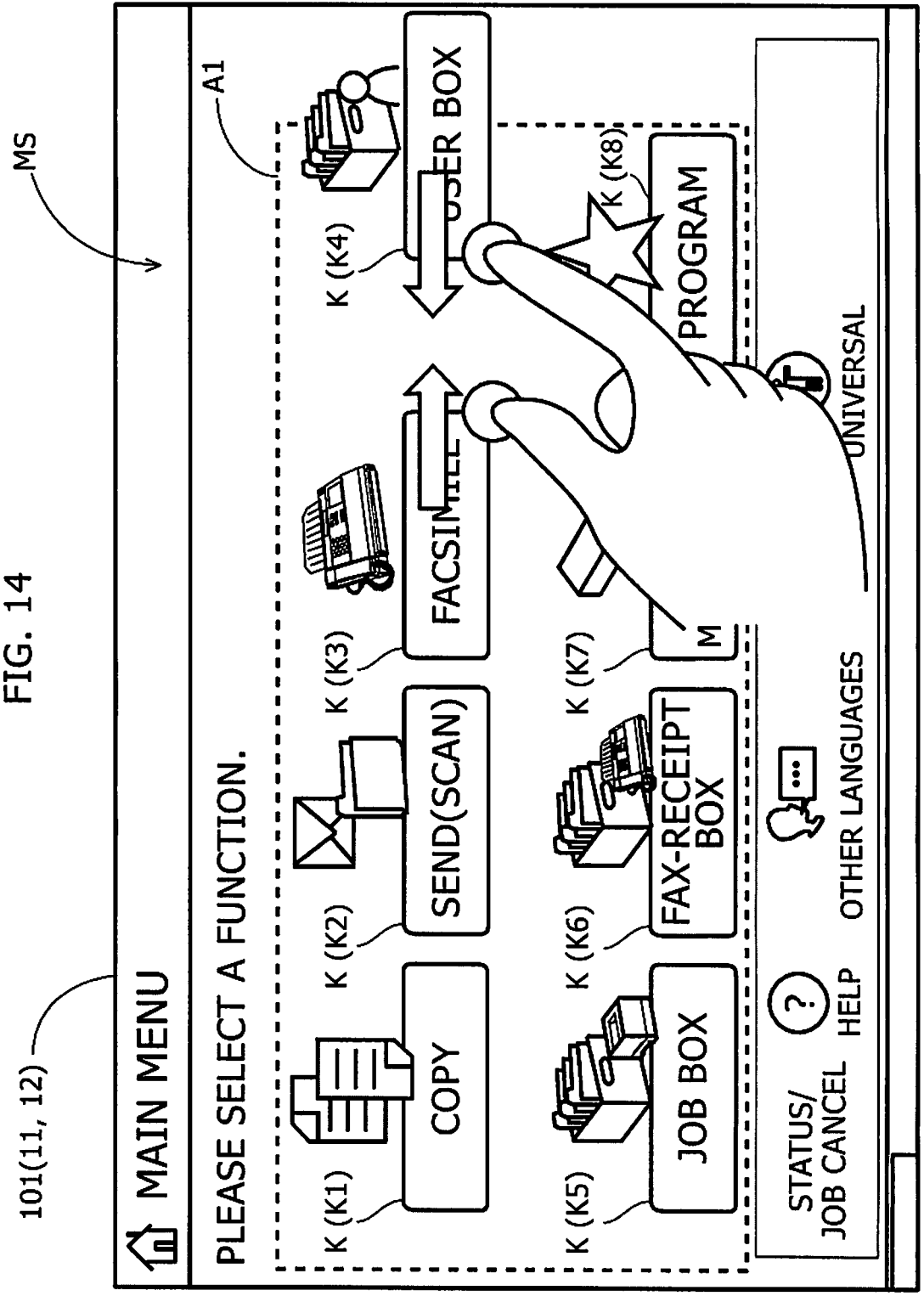
FIG. 14 shows a diagram which explains an operation and a screen which are performed and displayed to release the layout edit mode in the display and input device of the image forming apparatus shown in FIG. 1.

Further, some users may want to forcibly cancel the layout edit mode without changing the position order of the soft keys K after switching to the layout edit mode (i.e. after the interval enlargement operation). Therefore, a cancel operation is available for a user to forcibly cancel the layout edit mode. For example, after switching to the layout edit mode (i.e. after the interval enlargement operation), as shown in FIG. 14, the touch panel unit 11 receives an interval reduction operation (i.e. a cancel operation) to forcibly cancel the layout edit mode. Here, the interval reduction operation is an operation to touch two positions and reduce the interval between the two positions. It should be noted that the touched positions are not limited in this case. FIG. 14 shows an instance of the interval reduction operation to (a) touch two positions which include a position in a display area of at least one of the two soft keys K between which the interval is enlarged and then (b) slide the two touched positions in respective directions (here, the horizontal directions on the screen) to make the interval shorter. Alternatively, pressing a reset key among hard keys disposed on the operation panel 101 (see FIG. 2) also forcibly releases the layout edit mode.

After switching to the layout edit mode (i.e. after receiving the interval enlargement operation to the touch panel unit 11), if the cancel operation such as the interval reduction operation is received, then the liquid crystal display unit 12 displays the plural soft keys K in array with the predetermined spatial interval without changing a position order of the plural soft keys K. As mentioned, even after the interval enlargement operation, plural objects can be displayed in array with the predetermined spatial interval without changing a position order of the plural objects. Therefore, it is convenient for a user who performs the interval enlargement operation in error. Further, after switching to the layout edit mode (i.e. after receiving the interval enlargement operation to the touch panel unit 11), if a predetermined time has elapsed without any operations to the touch panel unit 11, then the liquid crystal display unit 12 also displays the plural soft keys K in array with the predetermined spatial interval without changing a position order of the plural soft keys K. Therefore, the interval between two objects which are adjacent to each other can be prevented from remaining enlarged for a long time.

Figure 15:
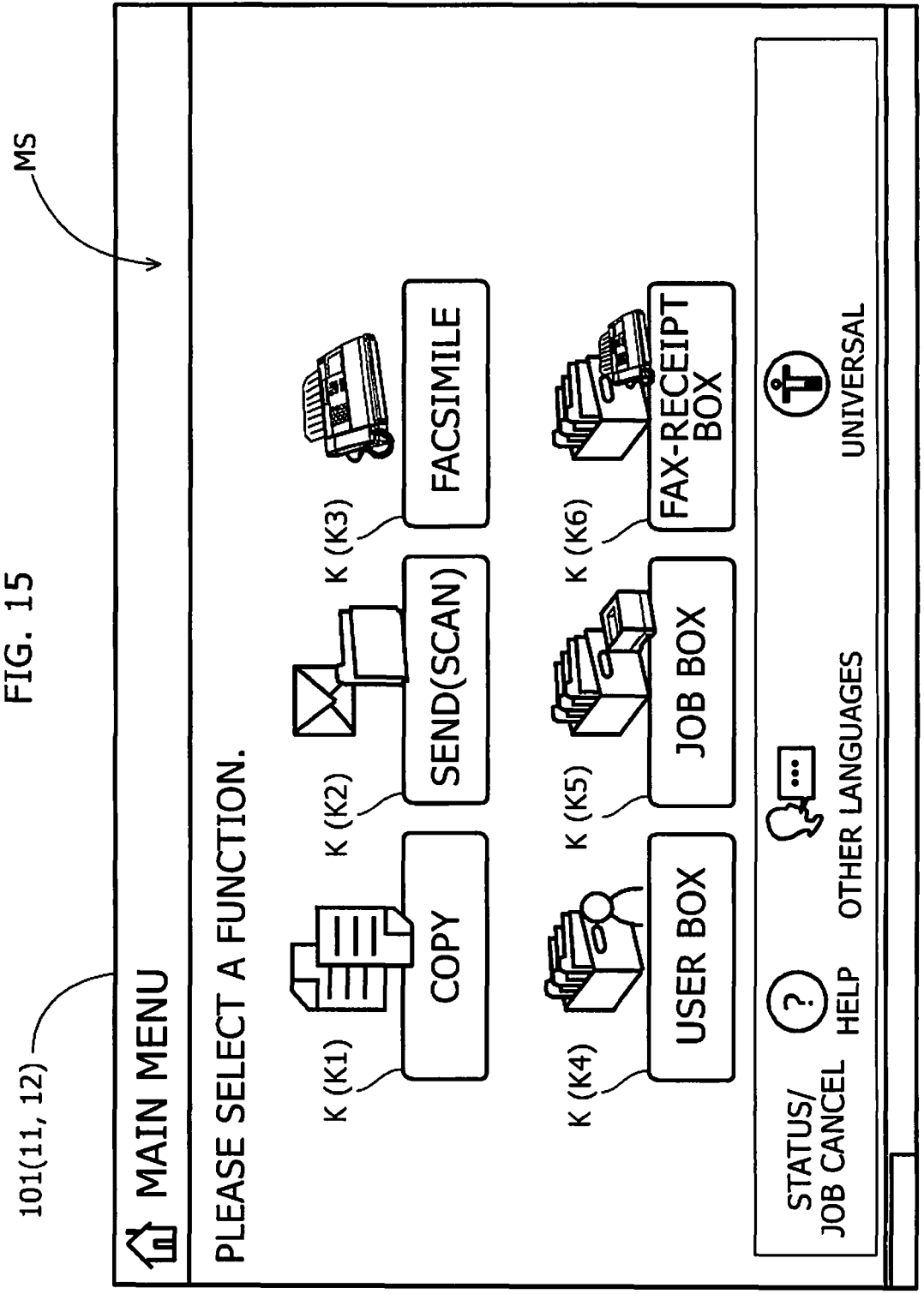
FIG. 15 shows a diagram which explains a screen displayed when displayed objects were reduced in the display and input device of the image forming apparatus shown in FIG. 1.

Incidentally, the number of the soft keys K displayed on one screen can be changed. For example, as shown in FIG. 15, the number of the soft keys K displayed on one screen can be reduced. FIG. 15 shows an instance in which the number of the soft keys K displayed on one screen is reduced to six. In such a case, for example, performing an operation like a finger sweep on the panel surface (i.e. a flick operation) can change the soft keys K displayed in the screen as shown in FIG. 16.

Figure 16:
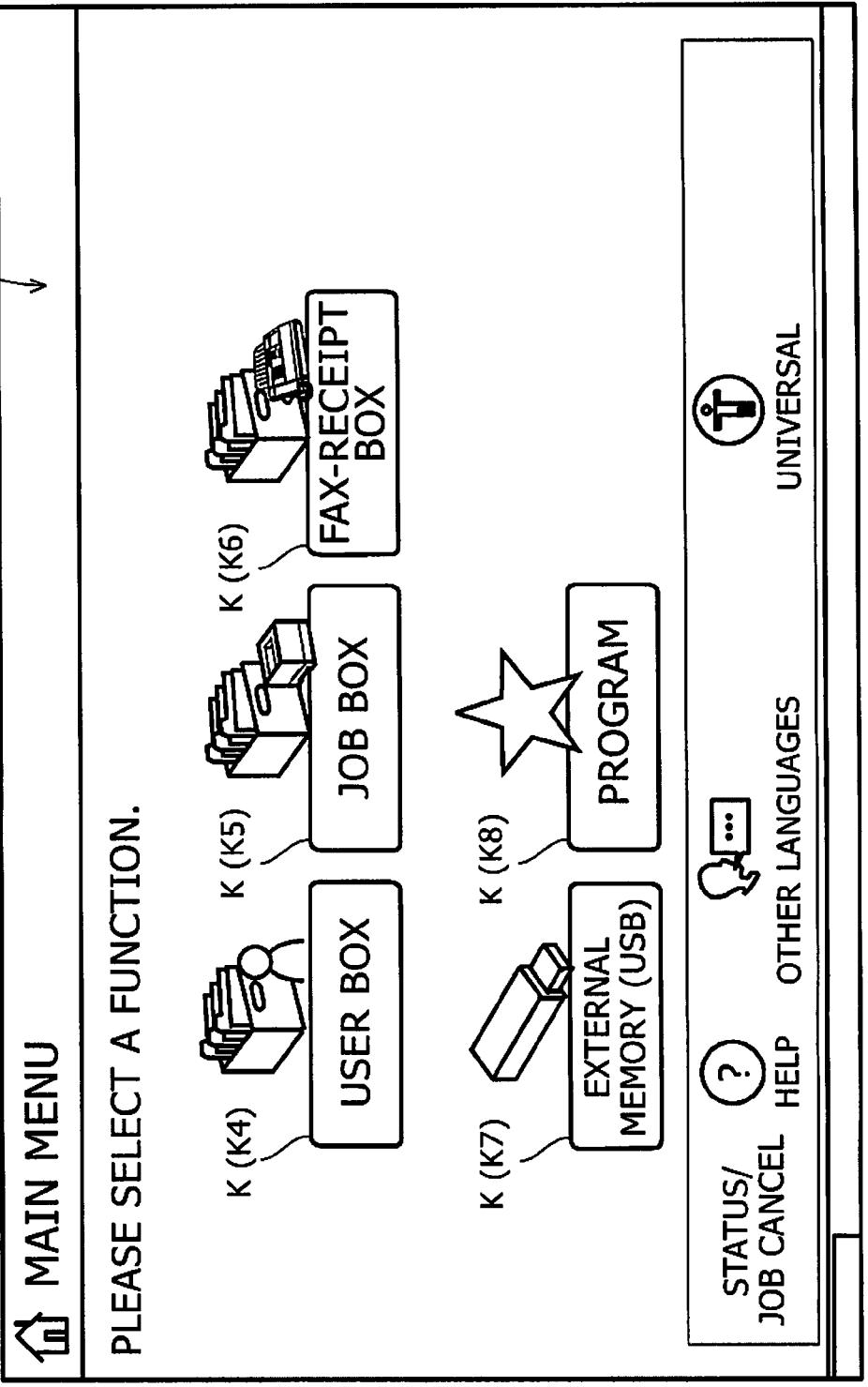
FIG. 16 shows a diagram which explains a screen displayed when displayed objects were reduced in the display and input device of the image forming apparatus shown in FIG. 1.
Figure 17:
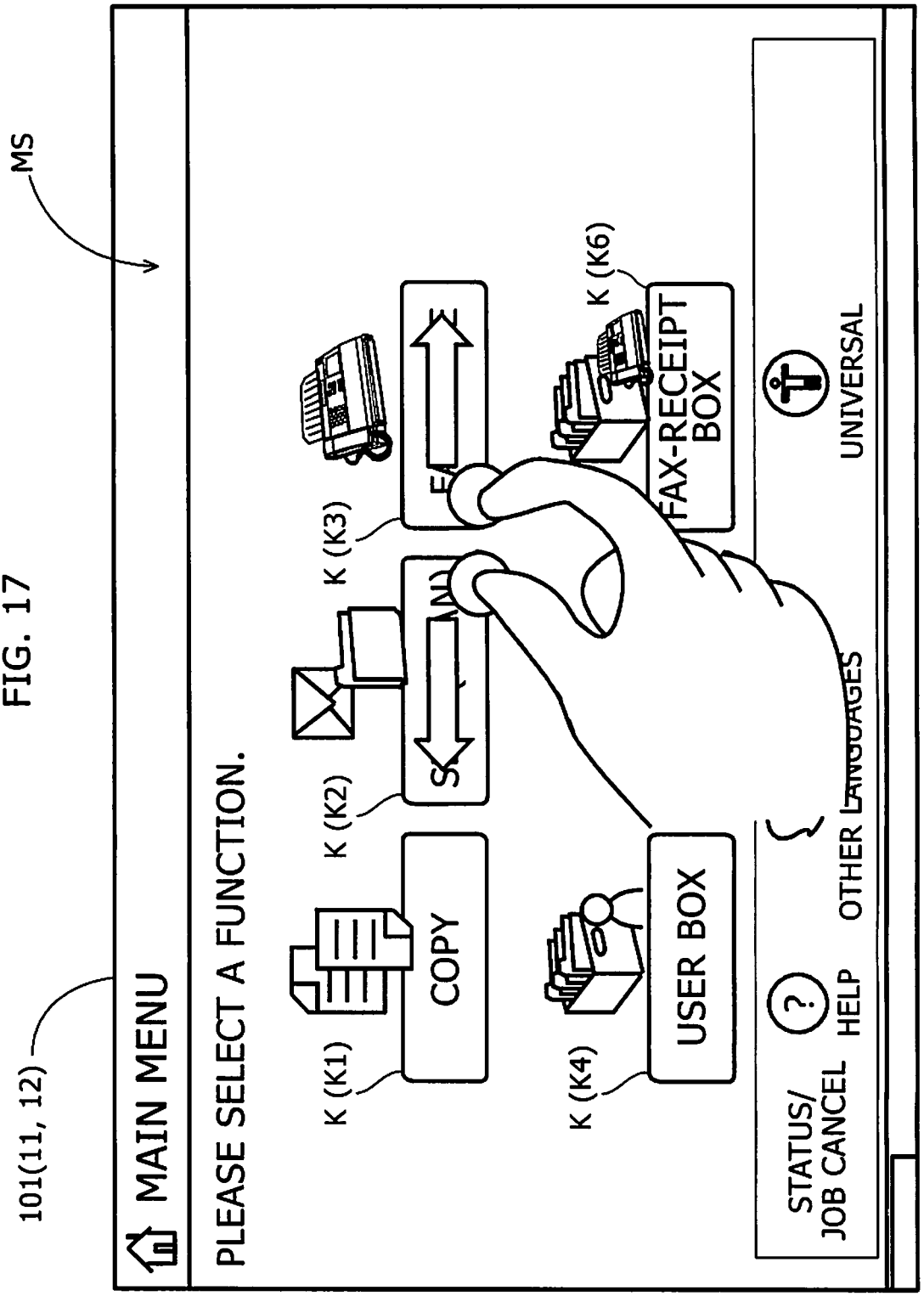
FIG. 17 shows a diagram which explains an operation and a screen which are performed and displayed to move an object (i.e. to switch to the layout edit mode) in the display and input device of the image forming apparatus shown in FIG. 1.
Figure 18:
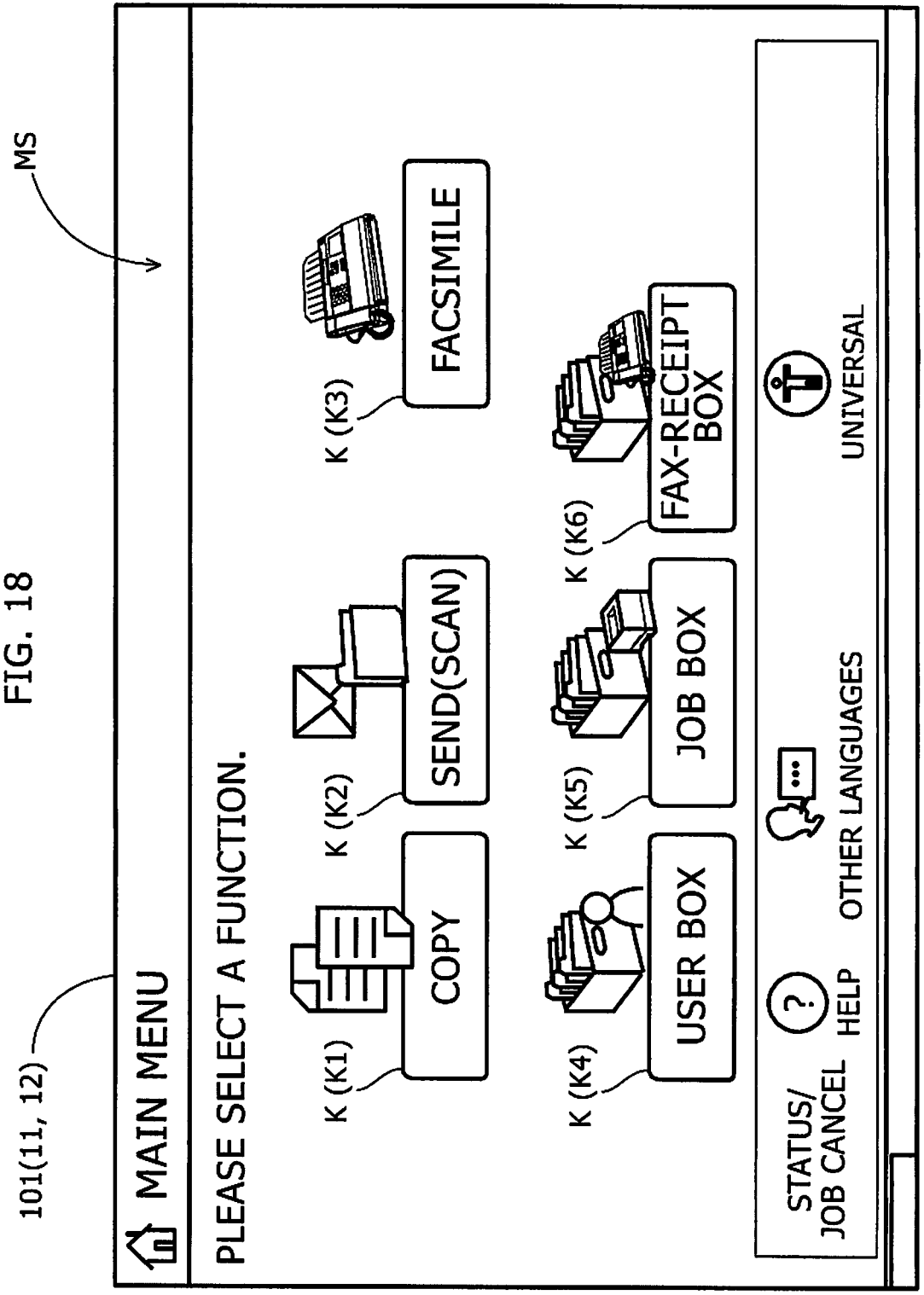
FIG. 18 shows a diagram which explains a screen in the layout edit mode of the display and input device of the image forming apparatus shown in FIG. 1.
Figure 19:
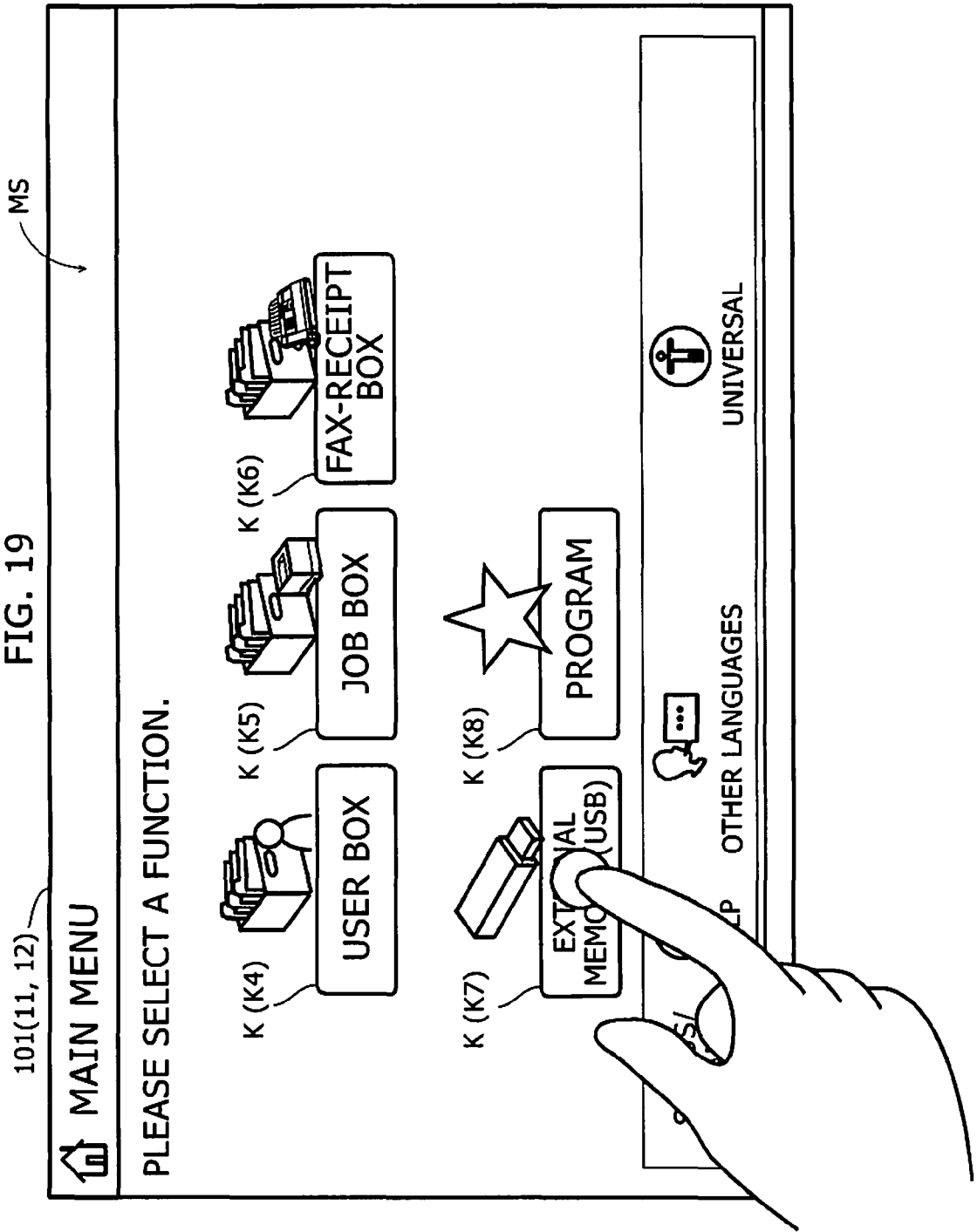
FIG. 19 shows a diagram which explains an operation and a screen which are performed and displayed to move an object (i.e. to change a position order of plural objects) in the display and input device of the image forming apparatus shown in FIG. 1.
Figure 20:
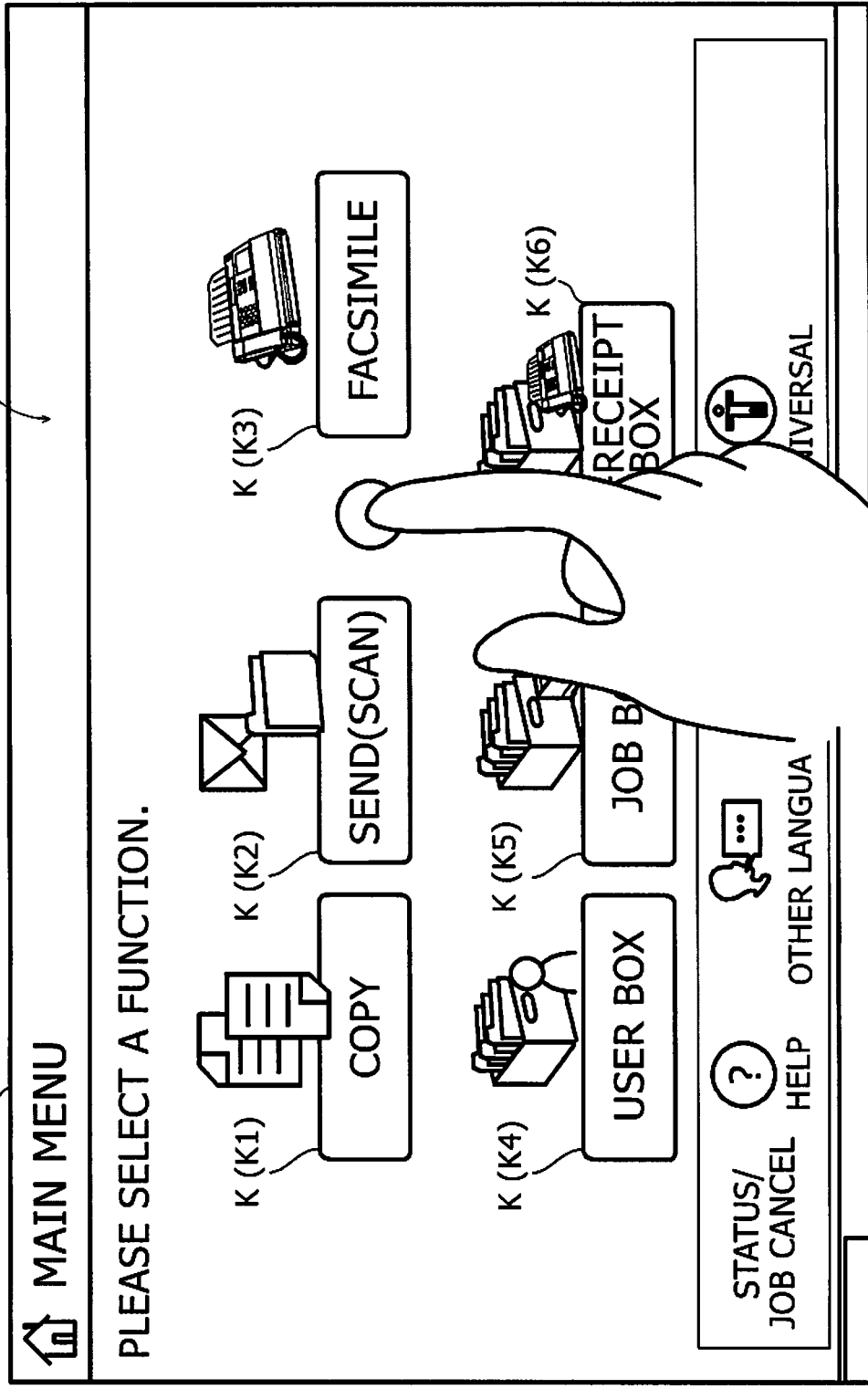
FIG. 20 shows a diagram which explains an operation and a screen which are performed and displayed to move an object (i.e. to change a position order of plural objects) in the display and input device of the image forming apparatus shown in FIG. 1.

In the screen layout shown in FIGS. 15 and 16, for example, if a user wants to move the soft key K7 to a position between the soft key K2 and the soft key K3, at first, the user performs the interval enlargement operation as shown in FIG. 17 to enlarge the interval between the soft key K2 and the soft key K3, and consequently, switches to the layout edit mode (changes to the screen shown in FIG. 18). Following it, as shown in FIG. 19, the user changes a current screen to the screen on which the soft key K7 is arranged, and performs the movement target setting operation to set the soft key K7 to the movement target. Afterward, as shown in FIG. 20, the user changes the screen to the screen on which the soft keys K2 and K3 are arranged and the interval between them is enlarged, and performs the destination confirmation operation to set a position between the soft key K2 and the soft key K3 to the destination of the soft key K7. Consequently, the soft key K7 is moved to a position between the soft key K2 and the soft key K3.

(Method to Switch to the Layout Edit Mode)

Some sorts of interval enlargement operations to switch to the layout edit mode are available other than an operation to slide two touched positions in respective directions (e.g. the horizontal directions on the screen) to make the interval longer (see FIG. 7).

Figure 21:
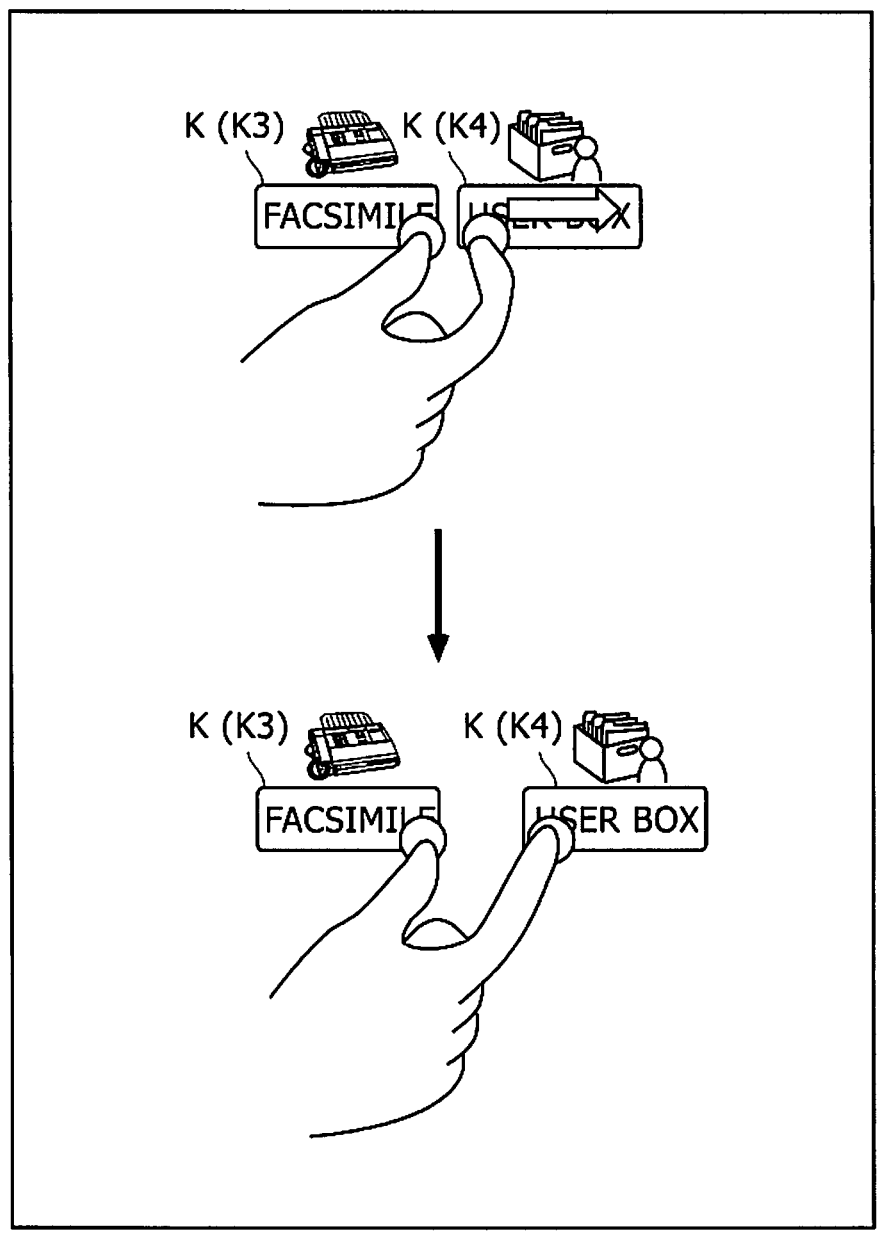
FIG. 21 shows a diagram which explains an operation performed to move an object (i.e. to switch to the layout edit mode) in the display and input device of the image forming apparatus shown in FIG. 1.
Figure 22:
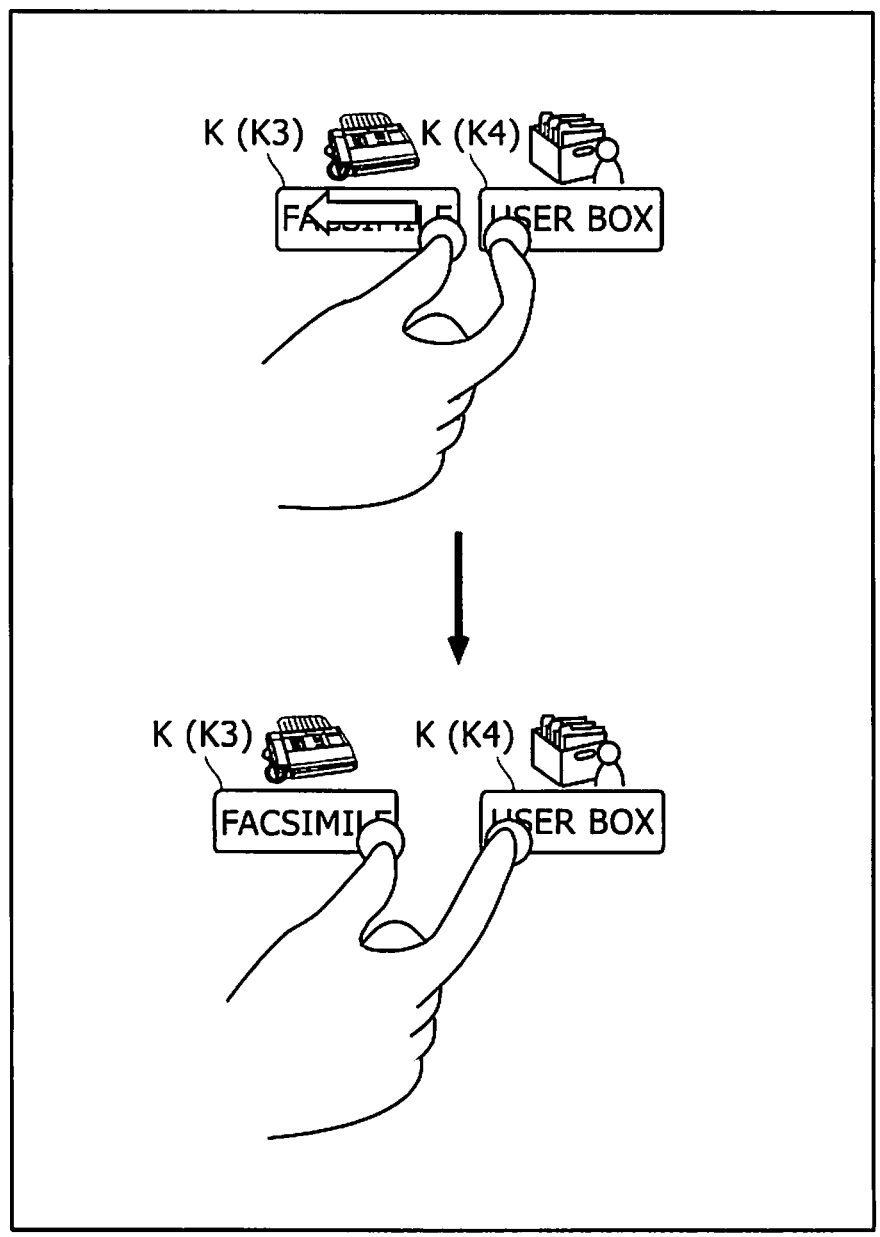
FIG. 22 shows a diagram which explains an operation performed to move an object (i.e. to switch to the layout edit mode) in the display and input device of the image forming apparatus shown in FIG. 1.

For example, when a user performs an operation to touch two positions which include a position in a display area of at least one of plural soft keys K and slide one of the two touched positions in the right direction on the screen with keeping the other of the two touched positions fixed (i.e. an operation to slide the one touched position away from the other touched position) as shown in FIG. 21, the touch panel unit 11 receives this operation as an interval enlargement operation. Further, when a user performs an operation to touch two positions which include a position in a display area of at least one of plural soft keys K and slide one of the two touched positions in the left direction on the screen with keeping the other of the two touched positions fixed (i.e. an operation to slide the one touched position away from the other touched position) as shown in FIG. 22, the touch panel unit 11 also receives this operation as an interval enlargement operation.

Incidentally, some users may want to enlarge an interval between soft keys K which are adjacent to each other in the vertical direction on the screen in order to switch to the layout edit mode. Therefore, when a user performs an operation to touch two positions which include a position in a display area of at least one of plural soft keys K and slide both of the two touched positions in the vertical directions on the screen (i.e. an operation to slide the two touched positions away from each other) as shown in FIG. 23, the touch panel unit 11 also receives this operation as an interval enlargement operation.

Figure 24:
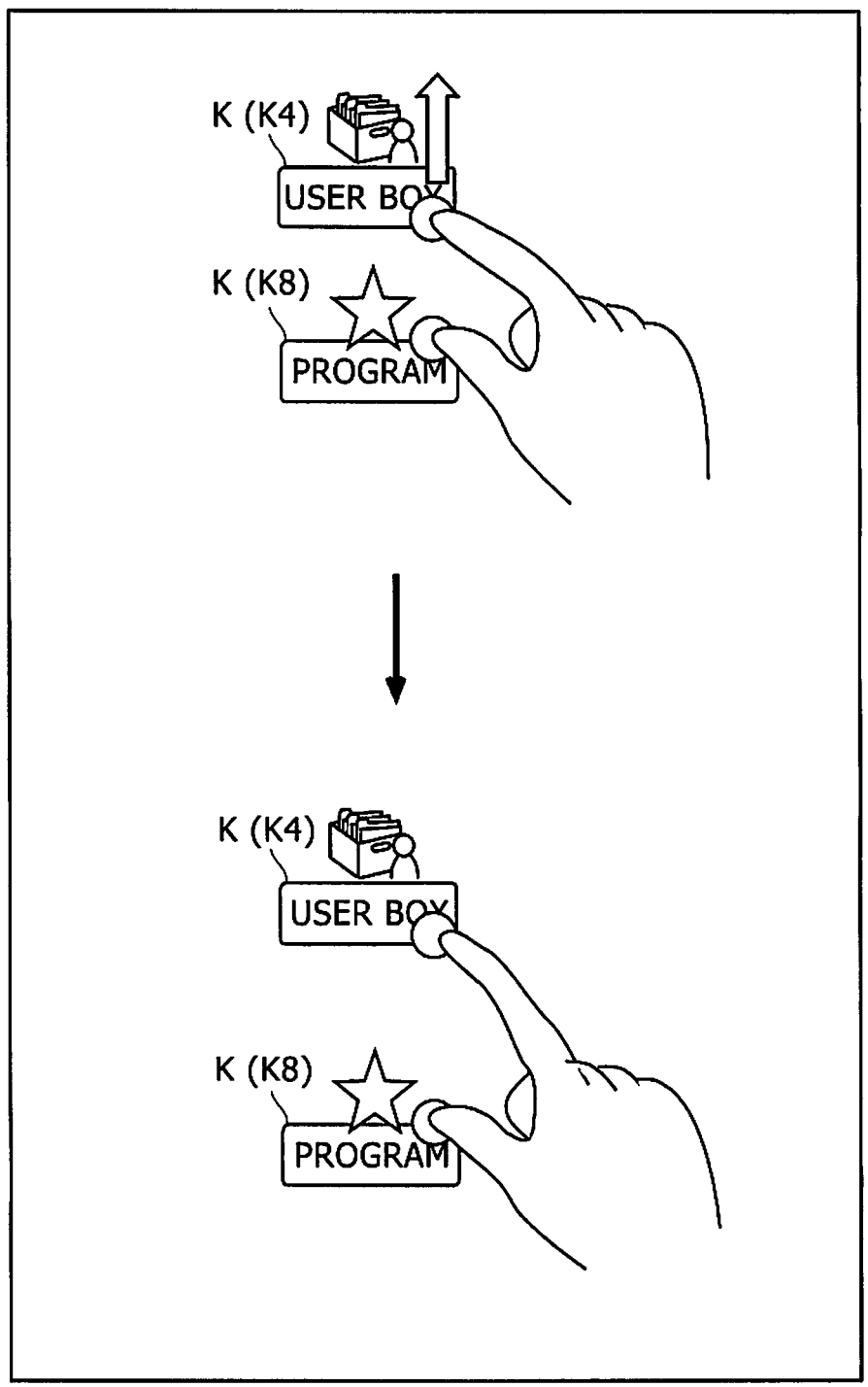
FIG. 24 shows a diagram which explains an operation performed to move an object (i.e. to switch to the layout edit mode) in the display and input device of the image forming apparatus shown in FIG. 1.

Further, when a user performs an operation to touch two positions which include a position in a display area of at least one of plural soft keys K and slide one of the two touched positions in the upward direction on the screen with keeping the other of the two touched positions fixed (i.e. an operation to slide the one touched position away from the other touched position) as shown in FIG. 24, the touch panel unit 11 also receives this operation as an interval enlargement operation. Furthermore, when a user performs an operation to touch two positions which include a position in a display area of at least one of plural soft keys K and slide one of the two touched positions in the downward direction on the screen with keeping the other of the two touched positions fixed (i.e. an operation to slide the one touched position away from the other touched position) as shown in FIG. 25, the touch panel unit 11 also receives this operation as an interval enlargement operation.

Figure 23:
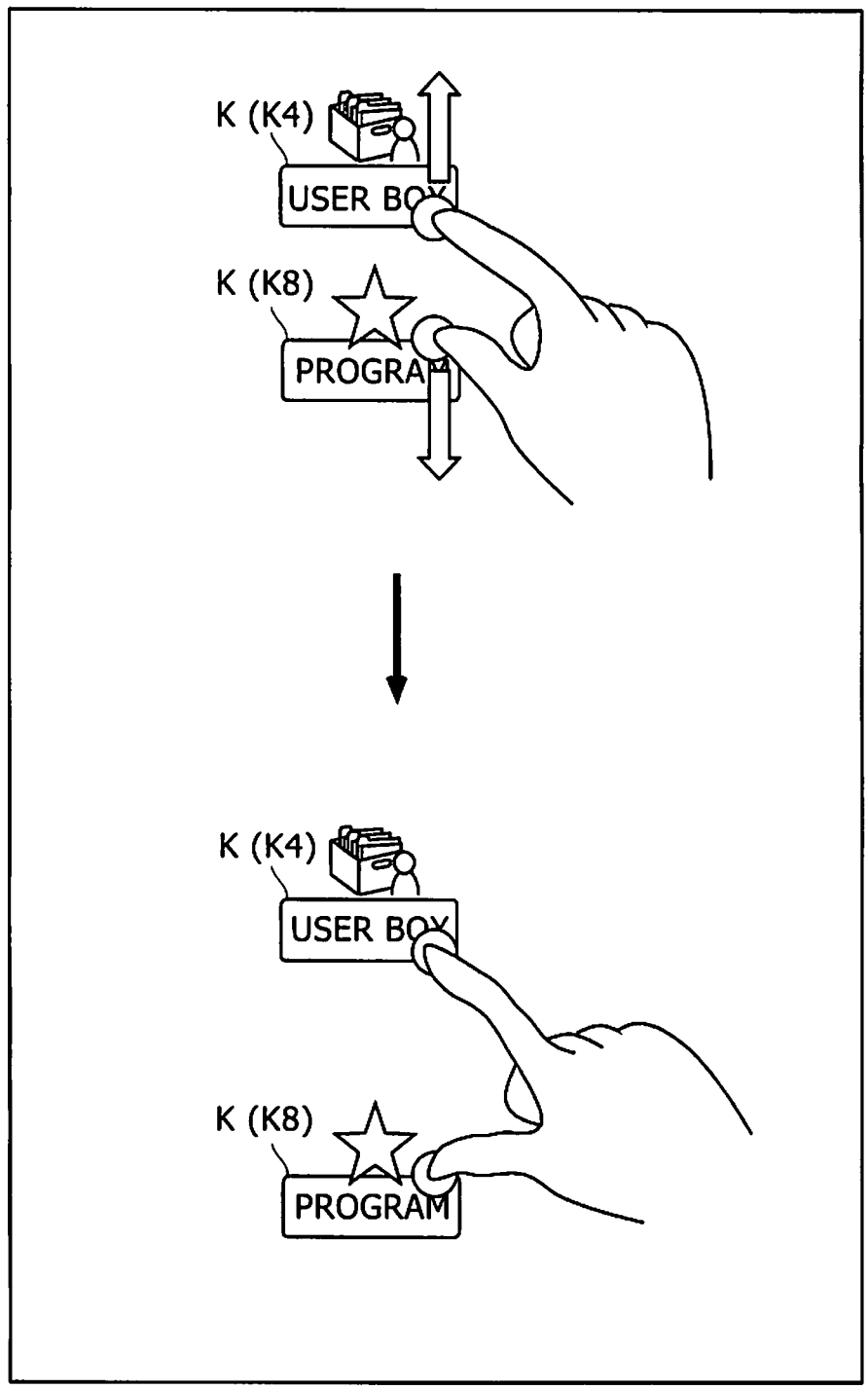
FIG. 23 shows a diagram which explains an operation performed to move an object (i.e. to switch to the layout edit mode) in the display and input device of the image forming apparatus shown in FIG. 1.
Figure 25:
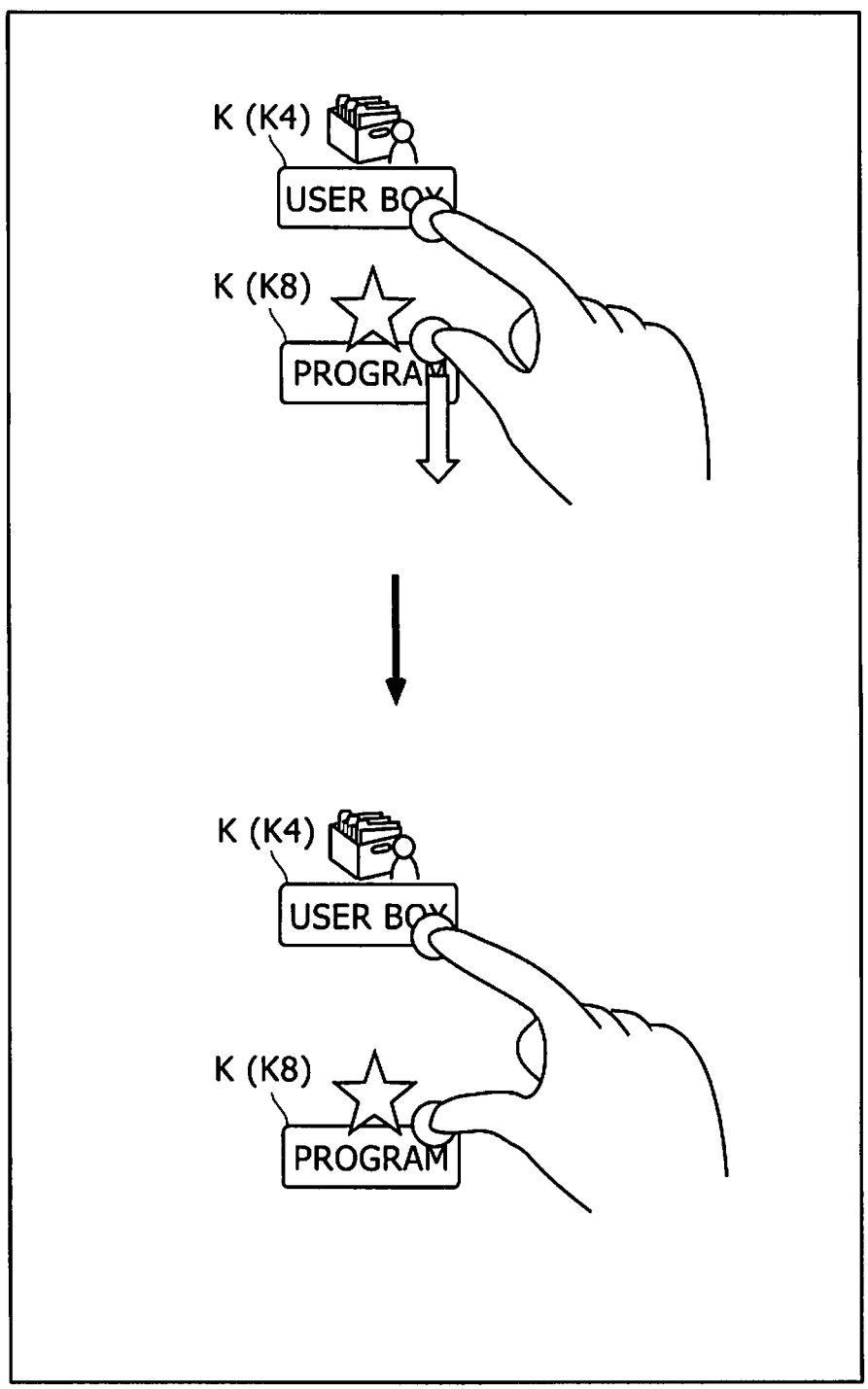
FIG. 25 shows a diagram which explains an operation performed to move an object (i.e. to switch to the layout edit mode) in the display and input device of the image forming apparatus shown in FIG. 1.

It should be noted that when the interval enlargement operation is performed as shown in FIGS. 23 to 25, in the vertical direction, the liquid crystal display unit 12 enlarges the interval between the two soft keys K which are adjacent to each other and include the soft key K displayed at the touched position.

(Flow of a Process to Edit the Screen Layout)

In the following part, referring to a flowchart shown in FIGS. 26 and 27, explained is the flow of a process to change a position order of plural objects (i.e. a screen layout) with moving any one of the plural objects while the liquid crystal display unit 12 displays a screen on which the plural objects are arranged in array. "A screen on which the plural objects are arranged in array" means, for instance, the main menu screen SC shown in FIG. 4 (in this case, the soft keys K are the objects) or the setting screen SB of the box function shown in FIG. 6 (in this case, the folder icons F are the objects). In the following explanation, respective ones of the soft key K and the folder icon are called "object".

Figure 26:
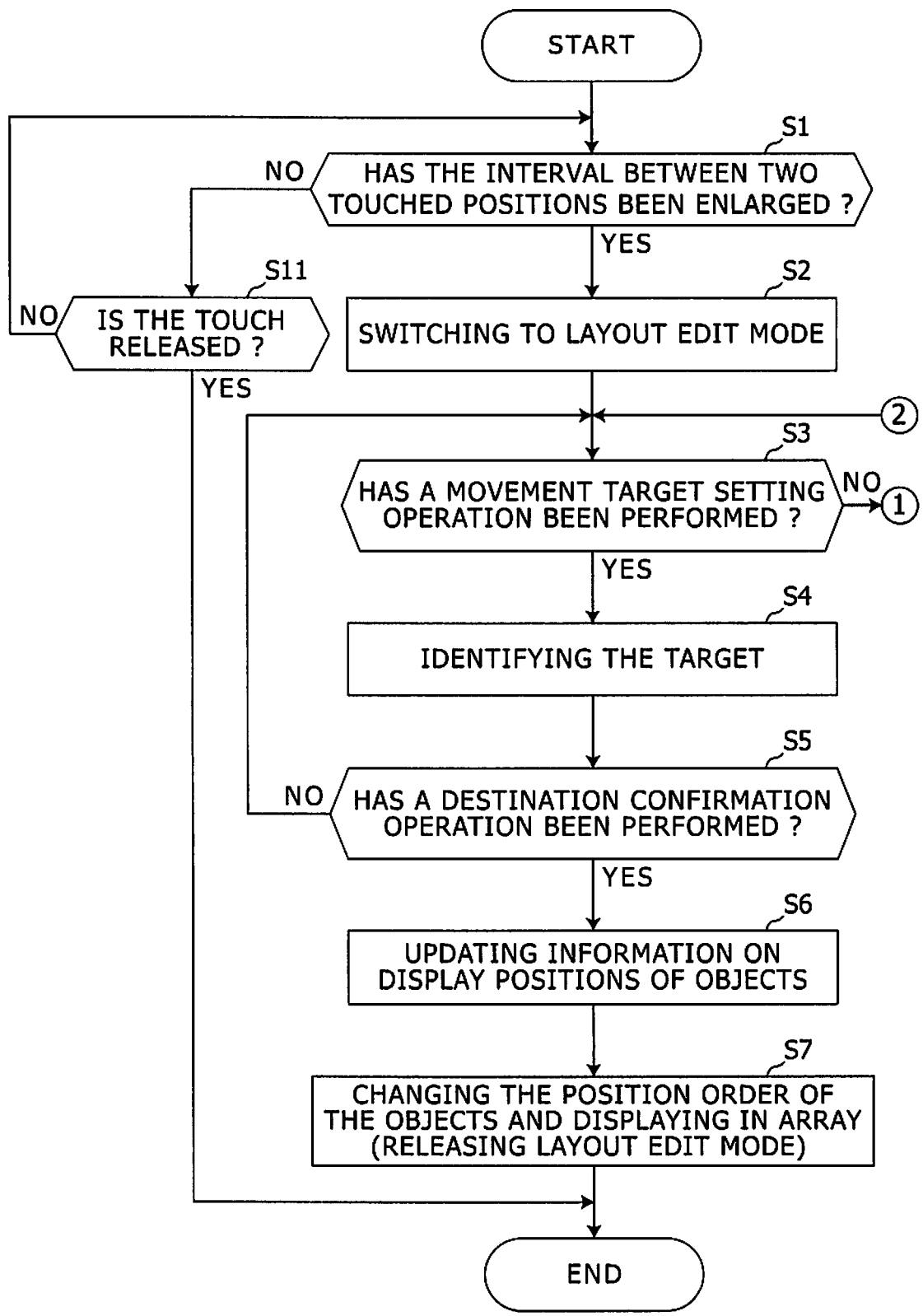
FIG. 26 shows a flowchart which explains a behavior when an object is moved (i.e. when switching to the layout edit mode and changing the position order of plural objects) in the display and input device of the image forming apparatus shown in FIG. 1.
Figure 27:
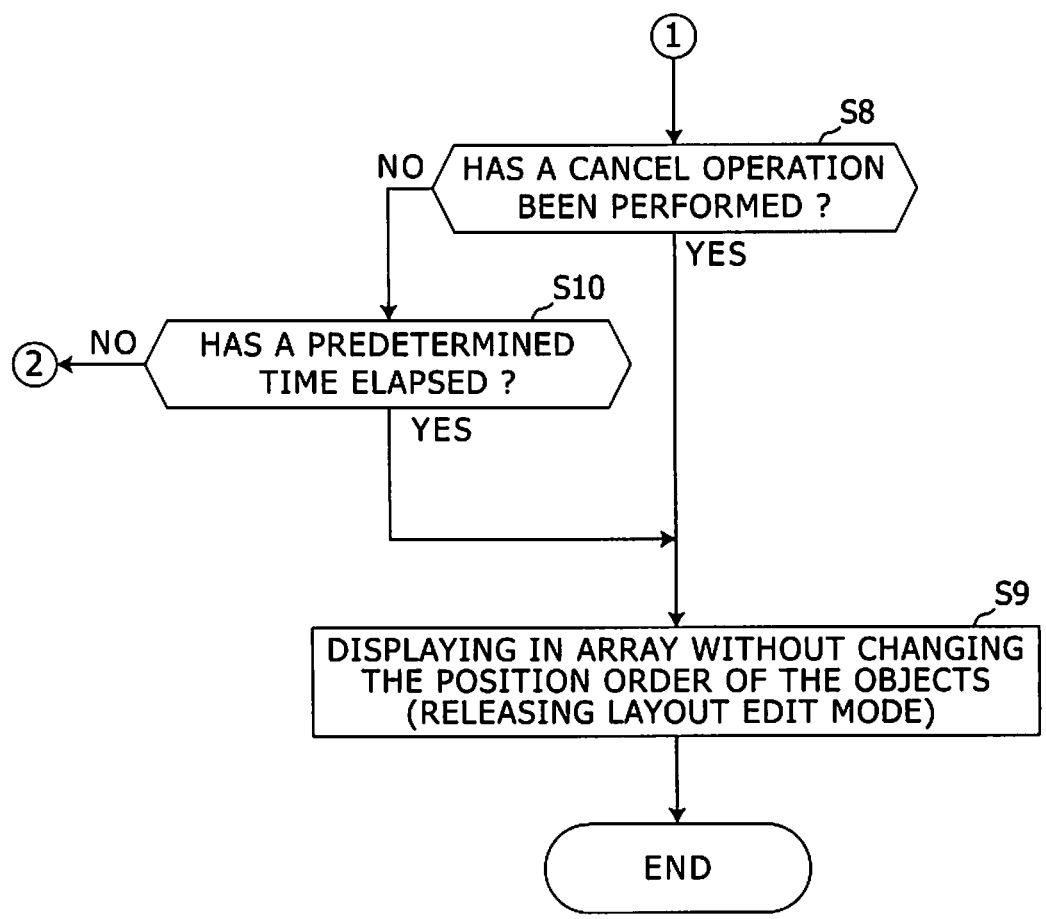
FIG. 27 shows a flowchart which explains a behavior when an object is moved (i.e. when switching to the layout edit mode and changing the position order of plural objects) in the display and input device of the image forming apparatus shown in FIG. 1.

At the start timing of the flowchart shown in FIG. 26, it is assumed that the liquid crystal display unit 12 displays plural objects in array with a predetermined spatial interval. Under this status, when a user performs an operation to the touch panel unit 11 to touch two positions which include a position in a display area of at least one of the plural objects, the process of the flowchart shown in FIG. 26 is started.

In Step S1, the display control unit 15 determines whether or not an operation to enlarge the interval between the two positions with keeping the two touches after the two positions are touched on the touch panel unit 11 (i.e. an interval enlargement operation) has been performed. According to the determination, if the operation to enlarge the interval between the two positions after the two positions are touched has been performed, then go to Step S2.

In Step S2, the display control unit 15 switches to the layout edit mode. In this layout edit mode, the liquid crystal display unit 12 enlarges the interval between two objects which are adjacent to each other and include an object displayed at the touched position longer than the predetermined interval. Under the status that the interval between the two objects is enlarged, the touch panel unit 11 receives a movement target setting operation to set a movement target, and a destination confirmation operation to set a destination of the movement target.

In Step S3, the display control unit 15 determines whether the movement setting operation (i.e. an operation to touch a display position of an object to be set as the movement target) has been performed to the touch panel unit 11 or not. According to the determination, if the movement setting operation has been performed, then go to Step S4. In Step S4, the display control unit 15 finally sets the object displayed at the touched position to the movement target.

In Step S5, the display control unit 15 determines whether the destination confirmation operation (i.e. an operation to touch a position between two objects between which the interval is enlarged) has been performed to the touch panel unit 11 or not. According to the determination, if the destination confirmation operation has been performed, then go to Step S6, and otherwise, if the destination confirmation operation has not been performed, then go to Step S3.

In Step S6, the display control unit 15 updates position information on display positions of the plural objects (i.e. information on a position order of the plural objects). In addition, in Step S7, the display control unit 15 releases the layout edit mode. Upon the release of the layout edit mode, the liquid crystal display unit 12 changes the position order of the plural objects so as to arrange the object as the movement target at the destination, and displays the plural objects in array with the predetermined spatial interval.

Incidentally, in Step S3, if the movement target setting operation has not been performed, then go to Step S8. In Step S8, the display control unit 15 determines whether a cancel operation to forcibly release the layout edit mode has been performed or not. Specifically, the display control unit 15 determines whether either an interval reduction operation to reduce the interval between the two touched positions on the touch panel unit 11 or a press of the reset key 17 has been performed or not. According to the determination, if the cancel operation has been performed, then go to Step S9, and otherwise, if the cancel operation has not been performed, then go to Step S10.

In Step S9, the display control unit 15 forcibly releases the layout edit mode. Upon the forcible release of the layout edit mode, the liquid crystal display unit 12 displays the plural objects in array with the predetermined spatial interval without changing the position order of the plural objects.

Otherwise, in Step S10, the display control unit 15 determines whether a predetermined time from the switch to the layout edit mode (i.e. from the time when the interval enlargement operation is performed to the touch panel unit 11) has elapsed without any operations to the touch panel unit 11 or not. According to the determination, if the predetermined time has elapsed, then go to Step S9, and otherwise, if the predetermined time has not elapsed, then go to Step S3.

Otherwise, in Step S1, if an operation to enlarge the interval between the two positions with keeping the two touches after the two positions are touched on the touch panel unit 11 (i.e. an interval enlargement operation) has not been performed, then go to Step S11. In Step S11, the display control unit 15 determines whether the touch to the touch panel unit 11 has been released or not. According to the determination, if the touch has been released, then the display control unit 15 does not switch to the layout edit mode. Otherwise, if the touch has not been released, then the display control unit 15 continuously performs the determination in Step S1.

In this embodiment, as mentioned, when a user performs an interval enlargement operation to touch two positions which include a position in a display area of at least one of plural objects (such as the soft keys K or the folder icons F) and then enlarge an interval between the two positions, the liquid crystal display unit 12 (corresponding to a "display unit") enlarges the interval between two objects which are adjacent to each other and include an object displayed at the touched position longer than a predetermined interval. Further, the touch panel unit 11 receives an operation to touch a destination position of an object to be moved under a status that an interval between two objects is enlarged, which is a destination confirmation operation to finally set the touched position to a destination of the object to be moved.

Therefore, from a user's view, when the user sets a position between two objects which are adjacent to each other to a destination of an object to be moved, the user can easily touch a position between the two objects without mistakes (i.e. it can reduce user mistake, that is, touching a display position of any one of the two objects by mistake). Consequently, it reduces inconvenience that the user has to redo operations to move the object from the first, and therefore, it is convenient for the user. Further, it is not required to change a current screen to a specific other screen to receive an operation to move the object, and consequently, many operations are not required before a user performs the operation to move the object. Furthermore, it is possible for a user to perform the operation to move the object while confirming a position order of the plural objects, and therefore, it is convenient for the user. Furthermore, enlarging the interval between the two touched positions results in enlarging the interval between two objects which are adjacent to each other, and therefore, an operation to enlarge the interval between two objects which are adjacent to each other is intuitive and easy for the user to understand. In this embodiment, the aforementioned user operation to move an object displayed by the liquid crystal display unit 12 results in high user convenience.

Further, in this embodiment, as mentioned, upon the interval enlargement operation to the touch panel unit 11, the liquid crystal display unit 12 enlarges an interval between two objects in the same direction as a direction in which an interval between the two touched positions is enlarged. For example, if the interval between the two touched positions is enlarged in the horizontal direction (i.e. in respective left and right directions), then the interval between the two objects is also enlarged in the horizontal direction; and if the interval between the two touched positions is enlarged in the vertical direction (i.e. in respective upward and downward directions), then the interval between the two objects is also enlarged in the vertical direction. Therefore, since a user can enlarge an interval between two objects in a desired direction, it is convenient for the user.

Furthermore, in this embodiment, as mentioned, the touch panel unit 11 receives an operation to touch two positions which include one position in a display area of any one of plural objects and then slide the two touched positions away from each other as the interval enlargement operation. Furthermore, the touch panel unit 11 receives an operation to touch two positions which include one position in a display area of any one of plural objects and then slide one of the two touched positions away from the other with keeping the other fixed as the interval enlargement operation. The touch panel unit 11 can receive these sorts of operations as the interval enlargement operation, and therefore, it is convenient for a user.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A display and input device, comprising:
a display unit configured to display plural objects in array with a predetermined spatial interval;
a touch panel unit disposed on the display unit and configured to identify plural positions touched by a user;
wherein the display unit is further configured to:
display a setting screen corresponding to an object among the plural objects when a display position of the object is touched; said setting screen allowing settings for the function corresponding to the touched object to be set;
switch to a layout edit mode in which an interval between two objects which are adjacent to each other is enlarged longer than the predetermined spatial interval in the layout edit mode, if the user touches two positions on the display including a position in the display area corresponding to at least one of the two objects and thereafter the user performs an interval enlargement operation to enlarge the interval between the two positions by sliding the two touched positions in respective different directions; wherein the display unit will enlarge the interval between the two positions and said display unit will not display a setting screen corresponding to an object among the plural objects when a display position of the object is touched when in said layout edit mode;
the touch panel unit is further configured to:
receive a movement target setting operation from the user; said movement target setting operation being when the user touches a display position of an object among the plural objects in the layout edit mode; wherein the display unit does not display a setting screen when said movement target setting operation is received and the touched object is designated as an object to move;
receive a destination confirmation operation from the user after the interval enlargement operation; said destination confirmation operation being when the user touches a destination position in the enlarged interval between the two positions; and
wherein when receiving the destination confirmation operation, the display unit is further configured to release the layout edit mode and change a position order of the plural objects so as to move said object to be moved to said destination position, and display the plural objects in array with the predetermined spatial interval after changing the position order.

2. The display and input device according to claim 1, wherein the display unit is further configured to display the plural objects in array with the predetermined spatial interval without changing the position order after the layout edit mode is entered and the user performs an interval reduction operation to the touch panel unit to reduce an interval between two touched positions.

3. The display and input device according to claim 1, wherein the display unit is further configured to display the plural objects in array with the predetermined spatial interval without changing the position order if a predetermined time elapses without any operations to the touch panel unit after the layout edit mode is entered.

4. The display and input device according to claim 1, wherein the touch panel unit is further configured to receive the movement target setting operation in twice or more times after the layout edit mode is entered until the destination confirmation operation is received.

5. The display and input device according to claim 1, wherein the display unit is further configured to move at least one object among the plural objects from the inside to the outside of an object display area in which the plural objects are arranged with the predetermined spatial interval when the interval between the two positions is enlarged.

6. The display and input device according to claim 1, wherein the display unit is further configured to overlap at least one object to another one among the plural objects when the interval between the two positions is enlarged.

7. The display and input device according to claim 1, wherein the display unit is further configured to enlarge the interval between the two objects in a same direction as a direction in which the interval between the two touched positions is enlarged.

8. The display and input device according to claim 1, wherein the touch panel unit is configured to receive an operation to touch two positions which include one position in a display area of any one of the plural objects and then slide the two touched positions away from each other.

9. The display and input device according to claim 1, wherein the touch panel unit is configured to receive an operation to touch two positions which include one position in a display area of any one of the plural objects and then slide one of the two touched positions away from the other of the two touched positions with keeping the other of the two touched positions fixed.

10. An image forming apparatus, comprising:
- a display and input device, the display and input device comprising:
- a display unit configured to display plural objects in array with a predetermined spatial interval;
- a touch panel unit disposed on the display unit and configured to identify plural positions touched by a user;
- wherein the display unit is further configured to:
    - display a setting screen corresponding to an object among the plural objects when a display position of the object is touched; said setting screen allowing settings for the function corresponding to the touched object to be set;
    - switch to a layout edit mode in which an interval between two objects which are adjacent to each other is enlarged longer than the predetermined spatial interval in the layout edit mode, if the user touches two positions on the display including a position in the display area corresponding to at least one of the two objects and thereafter the user performs an interval enlargement operation to enlarge the interval between the two positions by sliding the two touched positions in respective different directions; wherein the display unit will enlarge the interval between the two positions and said display unit will not display a setting screen corresponding to an object among the plural objects when a display position of the object is touched when in said layout edit mode;
- the touch panel unit is further configured to:
    - receive a movement target setting operation from the user; said movement target setting operation being when the user touches a display position of an object among the plural objects in the layout edit mode; wherein the display unit does not display a setting screen when said movement target setting operation is received and the touched object is designated as an object to move;
    - receive a destination confirmation operation from the user after the interval enlargement operation; said destination confirmation operation being when the user touches a destination position in the enlarged interval between the two positions in the layout edit mode; and
- wherein when receiving the destination confirmation operation, the display unit is further configured to release the layout edit mode and change a position order of the plural objects so as to move said object to be moved to said destination position, and display the plural objects in array with the predetermined spatial interval after changing the position order.

* * * * *